US012746796B2

(12) United States Patent
Suzuki

(10) Patent No.: US 12,746,796 B2
(45) Date of Patent: Sep. 29, 2026

(54) HEAT MANAGEMENT SYSTEM AND ELECTRIFIED VEHICLE

(71) Applicant: TOYOTA JIDOSHA KABUSHIKI KAISHA, Toyota (JP)

(72) Inventor: Tomoaki Suzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 18/439,928

(22) Filed: Feb. 13, 2024

(65) Prior Publication Data

US 2024/0300286 A1 Sep. 12, 2024

(30) Foreign Application Priority Data

Mar. 9, 2023 (JP) ................................ 2023-036653

(51) Int. Cl.

| | |
|---|---|
| ***B60H 1/00*** | (2006.01) |
| ***B60L 50/60*** | (2019.01) |
| ***B60L 58/27*** | (2019.01) |
| ***H01M 10/625*** | (2014.01) |
| ***H01M 10/63*** | (2014.01) |
| ***H01M 10/6556*** | (2014.01) |
| ***H01M 10/663*** | (2014.01) |

(52) U.S. Cl.

CPC ..... *B60H 1/00385* (2013.01); *B60H 1/00278* (2013.01); *B60L 50/60* (2019.02); *B60L 58/27* (2019.02); *H01M 10/625* (2015.04); *H01M 10/63* (2015.04); *H01M 10/6556* (2015.04); *H01M 10/663* (2015.04); *H01M 2220/20* (2013.01)

(58) Field of Classification Search

CPC ........... B60H 1/00385; B60H 1/00278; B60H 1/00485; B60H 1/00885; B60H 2001/00307; B60H 1/00478; B60H 1/14; B60H 1/2215; B60L 50/60; B60L 58/27; H01M 10/625; H01M 10/63; H01M 10/663; H01M 2220/20; Y02E 60/10

USPC ........................................................ 165/202

See application file for complete search history.

(56) References Cited

U.S. PATENT DOCUMENTS 10,369,866 B2 * 8/2019 Yamanaka ......... B60H 1/00807
11,541,726 B2 * 1/2023 Orihashi ............ B60H 1/00392

(Continued)

FOREIGN PATENT DOCUMENTS

CN 115027205 A * 9/2022 .......... H01M 10/635
CN 115257298 A * 11/2022 ......... B60H 1/00007

(Continued)

OTHER PUBLICATIONS

Machine Translation CN 115027205A (Year: 2022).*

*Primary Examiner* — Jenna M Maroney
*Assistant Examiner* — Gustavo A Hincapie Serna
(74) *Attorney, Agent, or Firm* — Oliff PLC

(57) ABSTRACT

A heat management system includes an electrical storage device configured to exchange heat with a first channel, a drive unit configured to exchange heat with a second channel, a radiator in a third channel, a chiller device in a fourth channel, and a switching unit. In the heat management system, when the electrical storage device is heated, the switching unit is controlled such that the electrical storage device, the drive unit, the radiator, and the chiller device are isolated and independent of one another.

11 Claims, 17 Drawing Sheets

(56) References Cited

U.S. PATENT DOCUMENTS

| | | | | |
|---|---|---|---|---|
| 2013/0032743 | A1* | 2/2013 | Fong | F02D 13/02 251/231 |
| 2017/0297414 | A1 | 10/2017 | Beloe | |
| 2018/0264913 | A1* | 9/2018 | Enomoto | B60H 1/32284 |
| 2018/0354344 | A1* | 12/2018 | Miura | B60H 1/08 |
| 2019/0070924 | A1* | 3/2019 | Mancini | B60H 1/32281 |
| 2020/0164718 | A1* | 5/2020 | Takei | B60L 3/0061 |
| 2020/0189357 | A1* | 6/2020 | Chopard | B60H 1/00499 |
| 2020/0361280 | A1* | 11/2020 | Hashimoto | B60H 1/00885 |
| 2020/0406783 | A1* | 12/2020 | Tokozakura | H01M 10/633 |
| 2021/0023950 | A1* | 1/2021 | Clowes | F15B 21/0423 |
| 2021/0291628 | A1* | 9/2021 | Kinoshita | B60H 1/00899 |
| 2021/0301691 | A1* | 9/2021 | Hasegawa | B60H 1/2218 |
| 2022/0134839 | A1* | 5/2022 | He | B60H 1/00485 165/203 |
| 2022/0305954 | A1* | 9/2022 | Haase | B60K 11/02 |
| 2022/0371402 | A1* | 11/2022 | Hasegawa | H01M 10/625 |
| 2022/0371404 | A1* | 11/2022 | Hasegawa | B60H 1/00899 |
| 2023/0021779 | A1* | 1/2023 | Schoeneman | B60L 53/302 |
| 2023/0034110 | A1* | 2/2023 | Huang | B60L 58/26 |
| 2023/0076418 | A1* | 3/2023 | He | H05K 7/20881 |
| 2023/0131786 | A1* | 4/2023 | Del Core | B60L 58/24 320/136 |
| 2023/0302873 | A1* | 9/2023 | Yeon | F16K 11/0856 |
| 2023/0398835 | A1* | 12/2023 | Hu | B60H 1/00921 |
| 2024/0133470 | A1* | 4/2024 | Chen | B60H 1/00485 |
| 2024/0262157 | A1* | 8/2024 | Shrivastava | B60H 1/00278 |

FOREIGN PATENT DOCUMENTS

| | | | | |
|---|---|---|---|---|
| DE | 10 2018 212 188 | A1 | 1/2020 | |
| DE | 102019214079 | A1 * | 3/2021 | H02K 9/19 |
| JP | 2010-272395 | A | 12/2010 | |
| JP | 2011-255879 | A | 12/2011 | |
| JP | 2021-164368 | A | 10/2021 | |

* cited by examiner

HEAT MANAGEMENT SYSTEM AND ELECTRIFIED VEHICLE

CROSS-REFERENCE TO RELATED APPLICATION

This application claims priority to Japanese Patent Application No. 2023-036653 filed on Mar. 9, 2023, incorporated herein by reference in its entirety.

BACKGROUND

1. Technical Field

The disclosure relates to a heat management system and an electrified vehicle.

2. Description of Related Art

Japanese Unexamined Patent Application Publication No. 2010-272395 (JP 2010-272395 A) describes an electrified vehicle. The electrified vehicle includes an electrical storage device (battery), an inverter, a motor, and a controller. The electrical storage device is connected to the inverter. The inverter is connected to the motor. The controller controls the current of the electrical storage device by means of switching control of the inverter. Thus, the controller controls heat generated due to power losses in an internal resistance of the electrical storage device. Therefore, the controller is capable of executing heating control for increasing the temperature of the electrical storage device by using the current of the electrical storage device (self-heating of the electrical storage device).

SUMMARY

In an electrical apparatus, such as an electrified vehicle, it is sometimes important to effectively use heat from a drive unit including an inverter and a motor. Furthermore, it is desired to efficiently heat an electrical storage device by itself. In other words, it is desired to effectively heat an electrical storage device by itself while making it possible to effectively use heat generated from a drive unit.

The disclosure provides a heat management system and electrified vehicle capable of making it possible to effectively use heat generated from a drive unit while efficiently heating an electrical storage device by itself.

A first aspect of the disclosure provides a heat management system. The heat management system is provided in an electrical apparatus. The heat management system includes a first channel, a second channel, a third channel, and a fourth channel configured such that a heat medium is allowed to flow through the first channel, the second channel, the third channel, and the fourth channel; an electrical storage device configured to exchange heat with the heat medium in the first channel; a drive unit configured to exchange heat with the heat medium in the second channel and be capable of generating driving force; a radiator provided in the third channel; a chiller device provided in the fourth channel; and a switching unit configured to be capable of switching a connection status among the first channel, the second channel, the third channel, and the fourth channel. A channel circuit in which the electrical storage device, the drive unit, the radiator, and the chiller device are isolated and independent of one another is defined as a heating circuit. When the electrical storage device is heated by passing current through the electrical storage device, the switching unit is configured to form the heating circuit.

In the heat management system according to the first aspect of the disclosure, as described above, when the electrical storage device is heated, the electrical storage device, the drive unit, the radiator, and the chiller device are isolated and independent of one another. Thus, it is possible to reduce removal of heat, generated by self-heating of the electrical storage device, by apparatuses such as the radiator and the chiller device that are irrespective of heating of the electrical storage device. It is also possible to accumulate heat, generated from the electrical storage device, in the second channel (heat storage). As a result, it is possible to effectively use heat generated from the drive unit and efficiently heat the electrical storage device by itself.

In the heat management system according to the first aspect, the electrical apparatus may be an electrified vehicle. When a driving system of the electrified vehicle is started, the electrical storage device may be heated. With this configuration, it is possible to easily increase a temperature of the electrical storage device at the time when an electrified vehicle starts moving. As a result, it is possible to easily provide a certain level or higher drive performance of the electrified vehicle at the time when the electrified vehicle starts moving.

In the heat management system according to the first aspect, the electrical storage device may be configured to be capable of being externally charged with charging power supplied from a charging station outside the electrical apparatus. The electrical storage device may be heated such that the temperature of the electrical storage device is higher than or equal to a predetermined temperature when the external charging is started. With this configuration, it is possible to easily increase the temperature of the electrical storage device when the external charging is started. As a result, it is possible to easily provide a certain level or higher rate of charge and charging efficiency when the external charging is started. The time when the external charging is started is timing at which charging power begins to be supplied to the electrical storage device.

The heat management system according to the first aspect may further include a first temperature sensor configured to detect a temperature of the electrical storage device and a second temperature sensor configured to detect a temperature of the heat medium in the second channel. When the electrical storage device is heated by passing current through the electrical storage device, the switching unit may be configured to form the heating circuit when the detected temperature of the heat medium is lower than the detected temperature of the electrical storage device. With this configuration, it is possible to suppress cooling of the electrical storage device by the heat medium in the second channel.

In the heat management system according to the first aspect, the electrical apparatus may be an electrified vehicle. The chiller device may be configured to exchange heat with an air-conditioning circuit configured to adjust a cabin temperature of the electrified vehicle. When a heating request using the air-conditioning circuit is issued and an outside air temperature is lower than or equal to a predetermined threshold, the electrical storage device may be heated in a state where the heating circuit is formed. With this configuration, when the outside air temperature is lower than or equal to the predetermined threshold, it is possible to reduce activation of heating using outside air with the radiator and the chiller device.

In the above configuration, when the electrical storage device is heated by passing current through the electrical storage device in the state where the heating circuit is formed, the switching unit may be configured to, when the outside air temperature becomes higher than the predetermined threshold, form a channel circuit with which the radiator and the chiller device are connected. With this configuration, when the outside air temperature becomes higher than or equal to the predetermined threshold, it is possible to activate heating using outside air with the radiator and the chiller device.

The heat management system according to the above aspect may further include a controller configured to control a current flowing through the electrical storage device and, when the electrical storage device is heated by passing current through the electrical storage device, control the switching unit such that connection among the first channel, the second channel, the third channel, and the fourth channel is disconnected.

In the above configuration, the switching unit may include a first six-way valve configured to connect the first channel and the second channel, and the fourth channel or disconnect the first channel and the second channel, and the fourth channel, and a second six-way valve configured to connect the second channel, and the third channel and the fourth channel or disconnect the second channel, and the third channel and the fourth channel.

In the above configuration, the switching unit may include a ten-way valve configured to connect the first channel and the second channel, and the third channel and the fourth channel or disconnect the first channel and the second channel, and the third channel and the fourth channel.

In the above configuration, the heat management system may further include a first temperature sensor configured to detect the temperature of the electrical storage device and a second temperature sensor configured to detect a temperature of a heat medium in the second channel. The controller may be configured to determine whether the detected temperature of the electrical storage device is higher than the detected temperature of the heat medium, and, when the controller determines that the detected temperature of the electrical storage device is higher than the detected temperature of the heat medium, control the switching unit such that the first channel is disconnected from the second channel, the third channel, and the fourth channel.

A second aspect of the disclosure provides an electrified vehicle. The electrified vehicle includes the heat management system according to the first aspect. The electrical apparatus is an electrified vehicle.

The electrified vehicle according to the second aspect may further include an air-conditioning circuit configured to adjust a cabin temperature of the electrified vehicle, and a third temperature sensor configured to detect an outside air temperature. The chiller device may be configured to exchange heat with the air-conditioning circuit. The controller may be configured to determine whether a heating request using the air-conditioning circuit is issued and, when the controller determines that the heating request using the air-conditioning circuit is issued and the outside air temperature is lower than or equal to a predetermined threshold, pass current through the electrical storage device such that the electrical storage device is heated in a state where the first channel is disconnected from the second channel, the third channel, and the fourth channel.

According to the aspects of the disclosure, it is possible to effectively use heat generated from the drive unit and efficiently heat the electrical storage device by itself.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
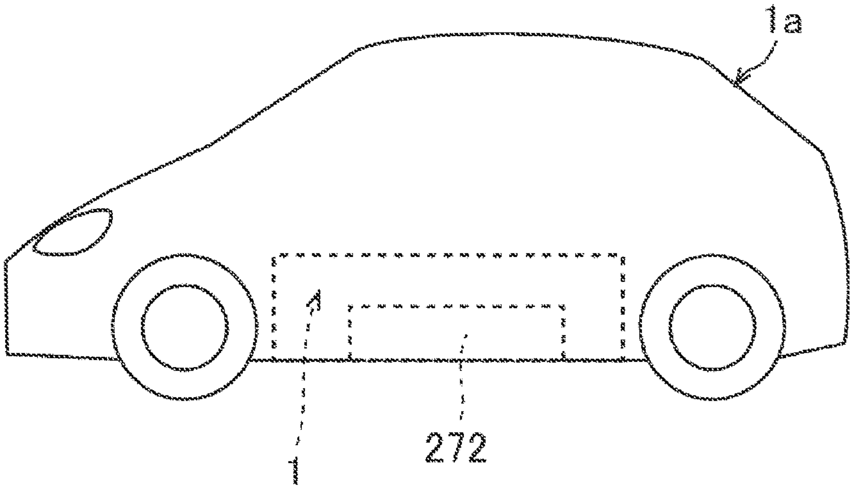
FIG. 1 is a diagram that shows an electrified vehicle equipped with a heat management system according to a first embodiment.

Hereinafter, a first embodiment of the disclosure will be described in detail with reference to the accompanying drawings. Like reference signs denote the same or corresponding portions in the drawings, and the description thereof will not be repeated.

Hereinafter, a configuration in which the heat management system according to the aspect of the disclosure is mounted on an electrified vehicle 1*a* (see FIG. 1) will be described as an example. The electrified vehicle 1*a* is preferably a vehicle equipped with a drive battery 272 and is, for example, a battery electric vehicle (BEV). The electrified vehicle 1*a* may be a hybrid electric vehicle (HEV), a plug-in hybrid electric vehicle (PHEV), or a fuel cell electric vehicle (FCEV). However, the uses of the heat management system according to the aspect of the disclosure are not limited to heat management systems for vehicles. The electrified vehicle 1*a* is an example of the electrical apparatus according to the aspect of the disclosure.

First Embodiment

Overall Configuration

Figure 2:
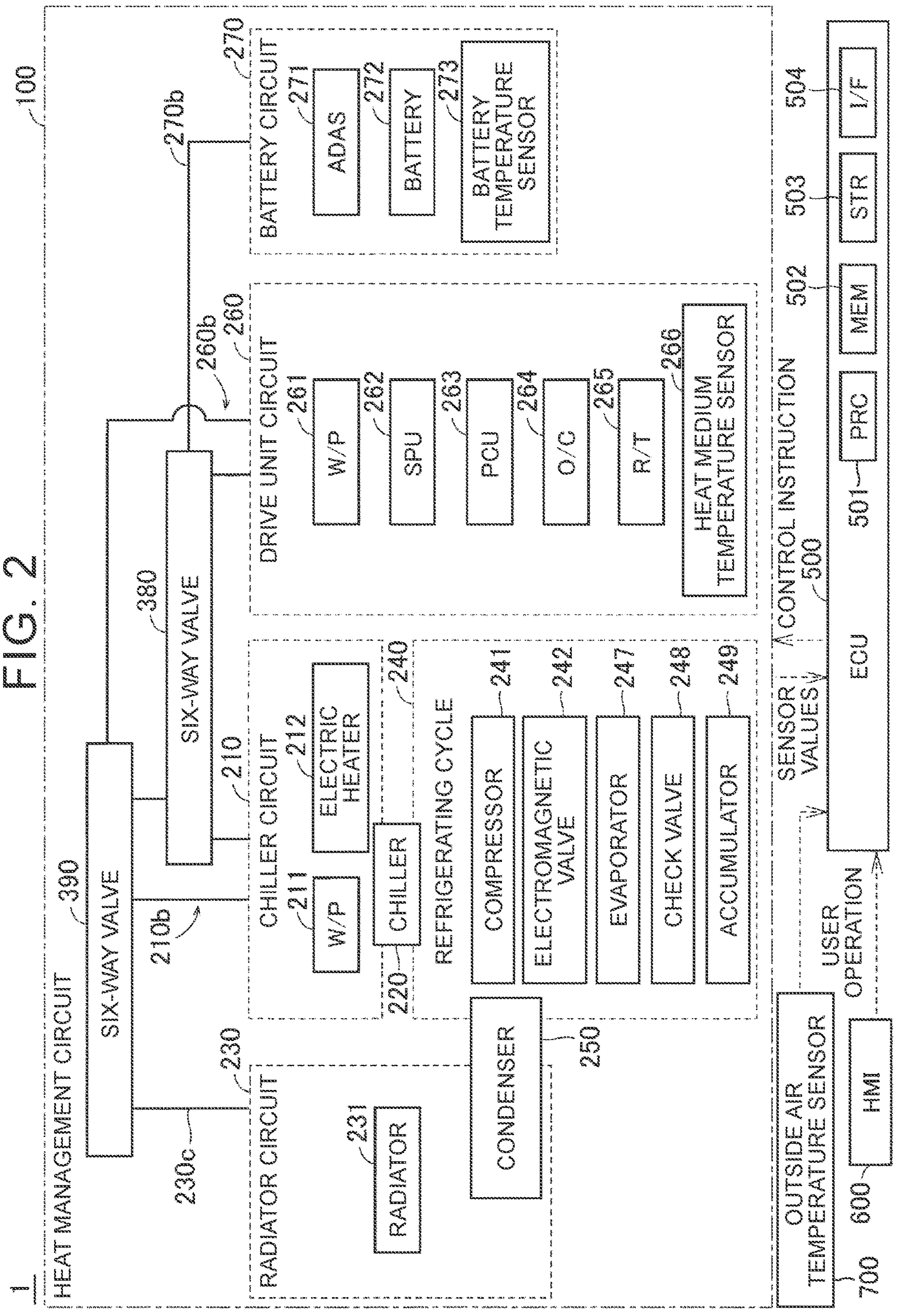
FIG. 2 is a block diagram that shows the configuration of the heat management system according to the first embodiment.

FIG. 2 is a block diagram that shows an example of the overall configuration of a heat management system 1 according to the first embodiment of the disclosure. The heat management system 1 includes a heat management circuit 100, an electronic control unit (ECU) 500, a human machine interface (HMI) 600, and an outside air temperature sensor 700.

The heat management circuit 100 includes, for example, a chiller circuit 210, a chiller 220, a radiator circuit 230, a refrigerating cycle 240, a condenser 250, a drive unit circuit 260, a battery circuit 270, a six-way valve 380, and a six-way valve 390. The six-way valve 380 and the six-way valve 390 are an example of the switching unit according to the aspect of the disclosure. The chiller 220 is an example of the chiller device according to the aspect of the disclosure. The refrigerating cycle 240 is an example of the air-conditioning circuit according to the aspect of the disclosure.

The chiller circuit 210 includes a water pump (W/P) 211 and an electric heater 212. The chiller 220 is connected to (shared between) both the chiller circuit 210 and the refrigerating cycle 240.

The radiator circuit 230 includes a radiator 231. The refrigerating cycle 240 includes, for example, a compressor 241, an electromagnetic valve 242, electromagnetic valves 244A, 244B, 245, 246 (see FIG. 3), an evaporator 247, a check valve 248, and an accumulator 249. The condenser 250 includes a water-cooled condenser 251 and an air-cooled condenser 252 (see FIG. 3). The water-cooled condenser 251 is connected to both the refrigerating cycle 240 and the radiator circuit 230.

The drive unit circuit 260 includes, for example, a water pump 261, an SPU 262, a PCU 263, an oil cooler 264, a reservoir tank 265, and a heat medium temperature sensor 266. Instead of the oil cooler 264, the transaxle may be provided in the drive unit circuit 260. The PCU 263 and the oil cooler 264 (or the transaxle) may be combined, and an e-axle may be installed. The PCU 263 and the oil cooler 264 are an example of the drive unit according to the aspect of the disclosure. The heat medium temperature sensor 266 is an example of the second temperature sensor according to the aspect of the disclosure.

The battery circuit 270 includes, for example, advanced driver-assistance systems (ADAS) 271, the battery 272, and a battery temperature sensor 273. The battery 272 is an example of the electrical storage device according to the aspect of the disclosure.

The battery temperature sensor 273 is an example of the first temperature sensor according to the aspect of the disclosure. A ripple heating circuit that heats the battery 272 by a ripple component of current flowing through the battery 272 may be provided in the battery circuit 270 (battery 272).

Figure 3:
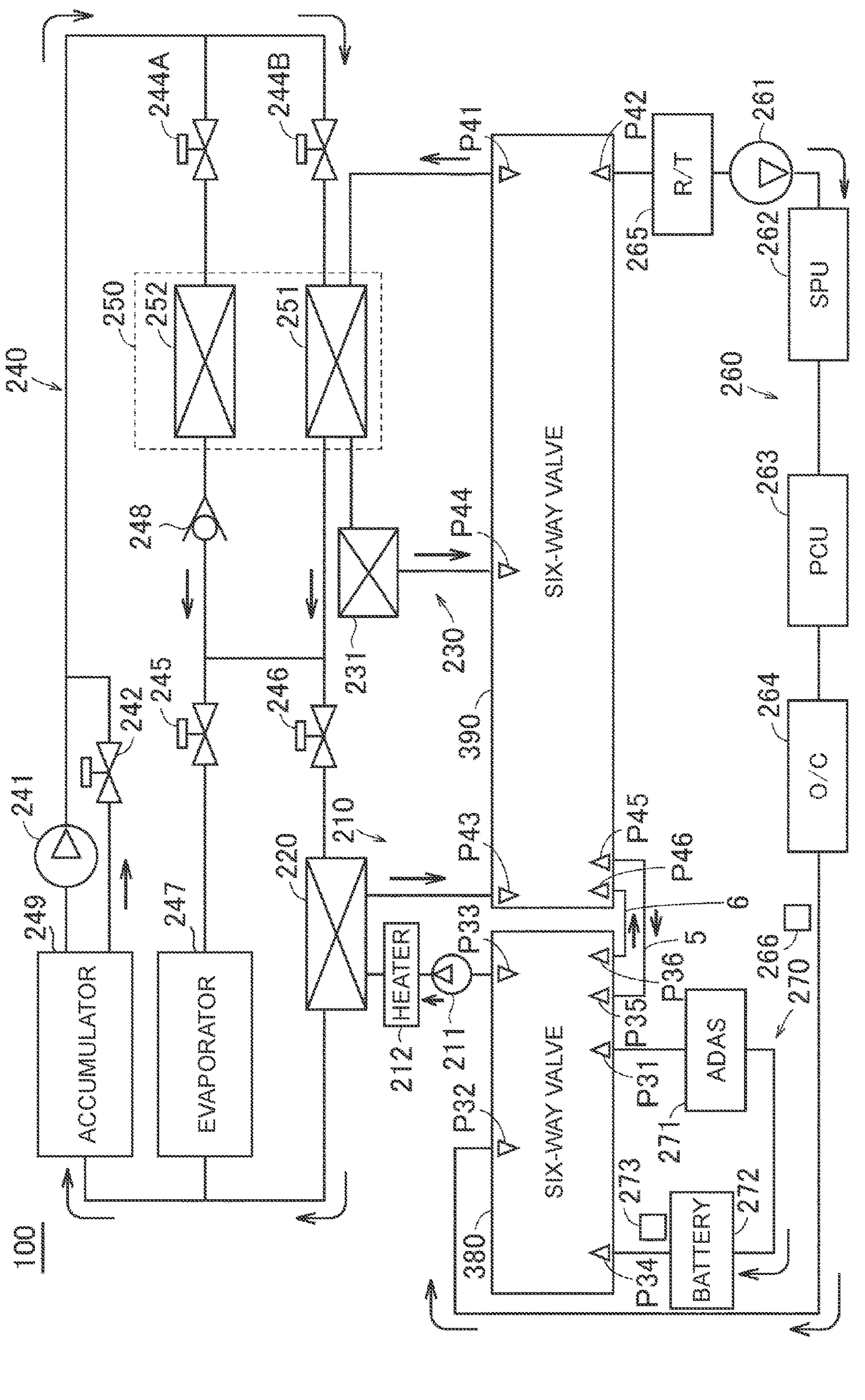
FIG. 3 is a block diagram that shows the detailed configuration of the heat management system according to the first embodiment.

The six-way valve 380 includes six ports P31, P32, P33, P34, P35, P36 (see FIG. 3). The six-way valve 390 includes six ports P41, P42, P43, P44, P45, P46 (see FIG. 3). The six-way valve 380 is connected to the chiller circuit 210, the drive unit circuit 260, and the battery circuit 270. The six-way valve 390 is connected to the chiller circuit 210, the drive unit circuit 260, and the radiator circuit 230.

The chiller 220 is provided in a channel 210*b* of the chiller circuit 210. The channel 210*b* is provided so as to connect the chiller circuit 210 with the six-way valve 380 and the six-way valve 390. In the chiller 220, a heat medium flowing through the channel 210*b* and a medium circulating through the refrigerating cycle 240 exchange heat with each other. The channel 210*b* is an example of the fourth channel according to the aspect of the disclosure.

The radiator 231 is provided in a channel 230*c*. The channel 230*c* is provided so as to connect the radiator 231 with the six-way valve 390. In the radiator 231, a heat medium flowing through the channel 230*c* and outside air exchange heat with each other. The channel 230*c* is an example of the third channel according to the aspect of the disclosure.

The water pump 261, the SPU 262, the PCU 263, the oil cooler 264, and the reservoir tank 265 are provided in a channel 260*b* of the drive unit circuit 260. The channel 260*b* is provided so as to connect the drive unit circuit 260 with the six-way valve 380 and the six-way valve 390. The PCU 263, the oil cooler 264, and the like exchange heat with a heat medium in the channel 260*b*. The channel 260*b* is in thermal contact with the SPU 262, the PCU 263, and the oil cooler 264. The channel 260*b* is an example of the second channel according to the aspect of the disclosure.

The battery 272 is provided in a channel 270*b* of the battery circuit 270. The channel 270*b* is provided so as to connect the battery circuit 270 with the six-way valve 380. The battery 272 exchanges heat with a heat medium in the channel 270*b*. The channel 270*b* is in thermal contact with the battery 272. The channel 270*b* is an example of the first channel according to the aspect of the disclosure.

The ECU 500 controls the heat management circuit 100. The ECU 500 includes a processor 501, a memory 502, a storage 503, and an interface 504.

The processor 501 is, for example, a central processing unit (CPU) or a micro-processing unit (MPU). The memory 502 is, for example, a random access memory (RAM). The storage 503 is a rewritable nonvolatile memory, such as a hard disk drive (HDD), a solid state drive (SSD), and a flash memory. A system program including an operating system (OS) and a control program including computer-readable code needed for control operations are stored in the storage 503. The processor 501 implements various processes by reading the system program and the control program, expanding the system program and the control program on the memory 502, and running the system program and the control program. The interface 504 controls communication between the ECU 500 and components of the heat management circuit 100.

The ECU 500 generates a control instruction based on sensor values acquired from various sensors (for example, the battery temperature sensor 273 and the heat medium temperature sensor 266) included in the heat management circuit 100, a user operation accepted by the HMI 600, and the like, and outputs the generated control instruction to the heat management circuit 100. The ECU 500 may be divided into a plurality of ECUs function by function. FIG. 2 shows an example in which the ECU 500 includes the single processor 501. Alternatively, the ECU 500 may include multiple processors. The same applies to the memory 502 and the storage 503.

In the specification, the term "processor" is not limited to a narrow-sense processor that executes a process in a stored program manner and can include a hard wired circuit, such as an application specific integrated circuit (ASIC) and a field-programmable gate array (FPGA). For this reason, the term "processor" may be read as processing circuitry in which a process is defined in advance by a computer-readable code and/or a hard wired circuit.

The HMI 600 is a touch panel display, an operation panel, a console, or the like. The HMI 600 accepts a user operation for controlling the heat management system 1. The HMI 600 outputs a signal indicating a user operation to the ECU 500.

The outside air temperature sensor 700 detects an outside air temperature outside the electrified vehicle 1*a*. Information on outside air temperature detected by the outside air temperature sensor 700 is sent to the ECU 500.

Configuration of Heat Management Circuit

FIG. 3 is a block diagram that shows an example of the configuration of the heat management circuit 100 according to the first embodiment. A heat medium circulating in the chiller circuit 210 flows along a route passing through the six-way valve 380 (port P33), the water pump 211, the electric heater 212, the chiller 220, and the six-way valve 390 (port P43).

The water pump 211 circulates the heat medium in the chiller circuit 210 in accordance with a control instruction from the ECU 500. The chiller 220 exchanges heat between a heat medium circulating in the chiller circuit 210 and a heat medium circulating in the refrigerating cycle 240. The six-way valve 380 and the six-way valve 390 switch a route to which the chiller circuit 210 is connected, in accordance with a control instruction from the ECU 500. Switching of the route by the six-way valve 380 and the six-way valve 390 will be described in detail later.

The electric heater 212 heats the heat medium flowing through the chiller circuit 210 (channel 210*b*). The electric heater 212 is controlled in accordance with a control instruction from the ECU 500.

A heat medium circulating in the radiator circuit 230 flows through the six-way valve 390 (port P41), the water-cooled condenser 251, the radiator 231, and the six-way valve 390 (port P44). The radiator 231 is disposed downstream of a grille shutter (not shown) and exchanges heat between air outside the vehicle and a heat medium.

A heat medium (gas refrigerant or liquid refrigerant) circulating in the refrigerating cycle 240 flows along any one of a first route, a second route, a third route, and a fourth route. The first route passes through the compressor 241, the electromagnetic valve 244A, the air-cooled condenser 252, the check valve 248, the electromagnetic valve (expansion valve) 245, the evaporator 247, the accumulator 249, and the compressor 241. The second route passes through the compressor 241, the electromagnetic valve 244A, the air-cooled condenser 252, the check valve 248, the electromagnetic valve (expansion valve) 246, the chiller 220, the accumulator 249, and the compressor 241. The third route passes through the compressor 241, the electromagnetic valve 244B, the water-cooled condenser 251, the electromagnetic valve (expansion valve) 245, the evaporator 247, the accumulator 249, and the compressor 241. The fourth route passes through the compressor 241, the electromagnetic valve 244B, the water-cooled condenser 251, the electromagnetic valve 246, the chiller 220, the accumulator 249, and the compressor 241.

The compressor 241 compresses gas refrigerant circulating in the refrigerating cycle 240, in accordance with a control instruction from the ECU 500. The electromagnetic valve 242 is connected in parallel with the compressor 241. The electromagnetic valve 242 adjusts the inflow of gas refrigerant to the compressor 241 in accordance with a control instruction from the ECU 500. The electromagnetic valves 244 (244A, 244B) switch whether gas refrigerant discharged from the compressor 241 flows into the water-cooled condenser 251 or the air-cooled condenser 252, in accordance with a control instruction from the ECU 500. The water-cooled condenser 251 exchanges heat between gas refrigerant discharged from the compressor 241 and a heat medium flowing in the radiator circuit 230. The air-cooled condenser 252 exchanges heat with air introduced into a vehicle cabin to create warm air. The electromagnetic valve 245 limits flow of liquid refrigerant into the evaporator 247 in accordance with a control instruction from the ECU 500. The electromagnetic valve 246 limits flow of liquid refrigerant into the chiller 220 in accordance with a control instruction from the ECU 500. The electromagnetic valves 245, 246 also have a function to expand liquid refrigerant. The accumulator 249 is to remove liquid refrigerant from refrigerant in a gas-liquid mixed state. When refrigerant is not completely evaporated by the evaporator 247, the accumulator 249 suppresses flow of liquid refrigerant into the compressor 241.

A heat medium (coolant) circulating in the drive unit circuit 260 flows along a route passing through the six-way valve 390 (port P42), the reservoir tank 265, the water pump 261, the SPU 262, the PCU 263, the oil cooler 264, and the six-way valve 380 (port P32).

The water pump 261 circulates the heat medium in the drive unit circuit 260 in accordance with a control instruction from the ECU 500. The SPU 262 controls charging and discharging of the battery 272 in accordance with a control instruction from the ECU 500. The PCU 263 converts direct-current power, supplied from the battery 272, to alternating-current power and supplies the alternating-current power to a motor (not shown) incorporated in a transaxle in accordance with a control instruction from the ECU 500. The oil cooler 264 cools the transaxle by heat exchange between the heat medium circulating in the drive unit circuit 260 and the lubricating oil of the motor. Heat may be exchanged between heat generated by supplying electric power to a stator of the motor without rotating a rotor of the motor and a heat medium circulating in the drive unit circuit 260.

The SPU 262, the PCU 263, and the oil cooler 264 are cooled by a heat medium circulating in the drive unit circuit 260. The reservoir tank 265 maintains the pressure and amount of heat medium in the drive unit circuit 260 by storing part of the heat medium in the drive unit circuit 260 (heat medium having overflowed due to an increase in pressure).

The heat medium temperature sensor 266 detects the temperature of the heat medium in the channel 260*b* in which the PCU 263 and the like are provided. For example, the heat medium temperature sensor 266 detects the temperature of the heat medium flowing between the oil cooler 264 and the six-way valve 380 (on the downstream side of the oil cooler 264). The heat medium temperature sensor 266 may, for example, detect the temperature of heat medium between the PCU 263 and the oil cooler 264.

A heat medium (coolant) circulating in the battery circuit 270 flows along a route passing through the six-way valve 380 (port P31), the ADAS 271, the battery 272, and the six-way valve 380 (port P34).

The ADAS 271 execute control including, for example, adaptive cruise control (ACC), auto speed limiter (ASL), lane keeping assist (LKA), pre-crash safety (PCS), and lane departure alert (LDA). The battery circuit 270 may include an autonomous driving system (ADS) in addition to the ADAS 271. The battery 272 supplies driving electric power to the motor incorporated in the transaxle. The battery temperature sensor 273 detects the temperature of the battery 272.

Communication Pattern

Figure 4:
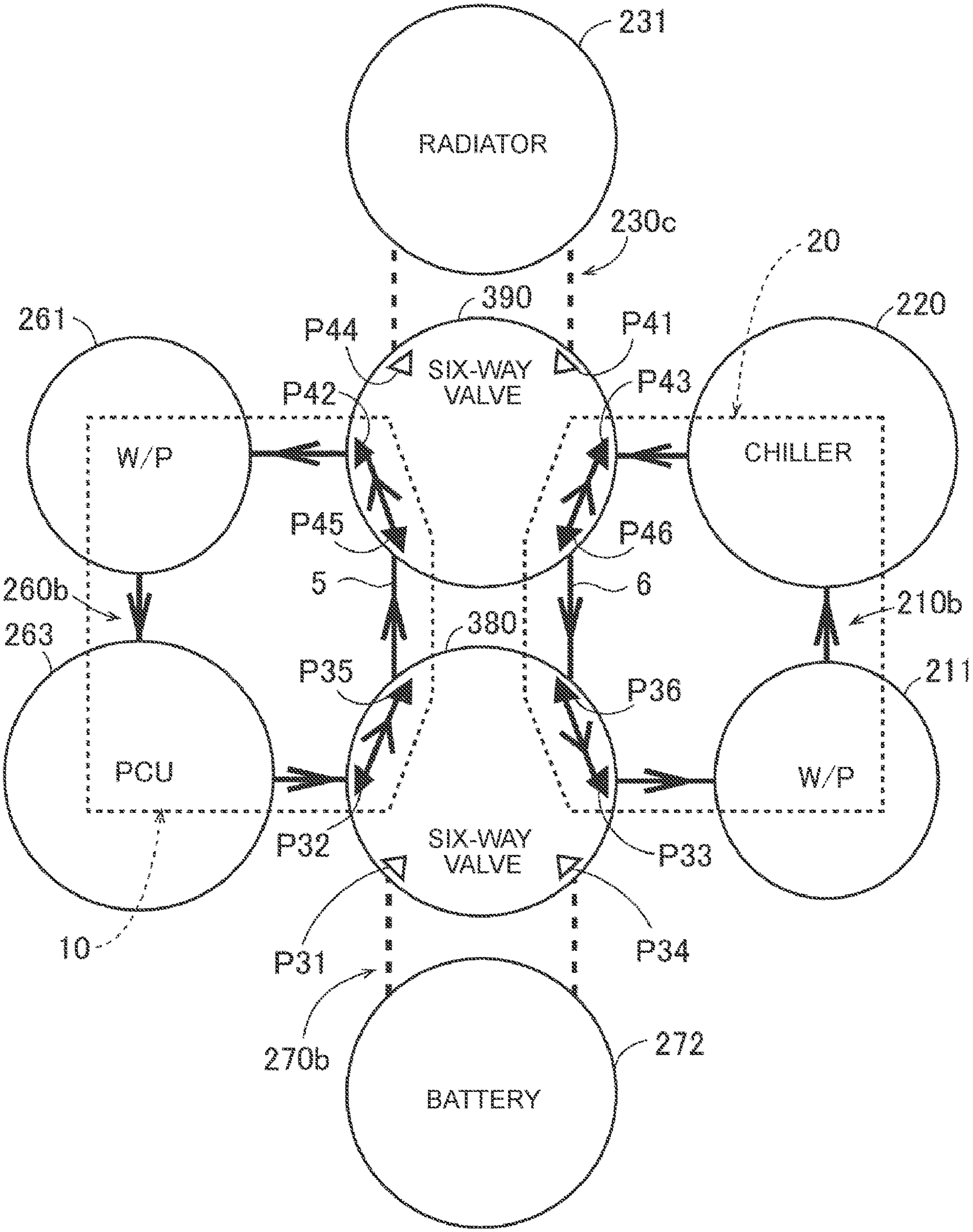
FIG. 4 is a diagram that shows a first communication pattern of a heat management circuit according to the first embodiment.
Figure 5:
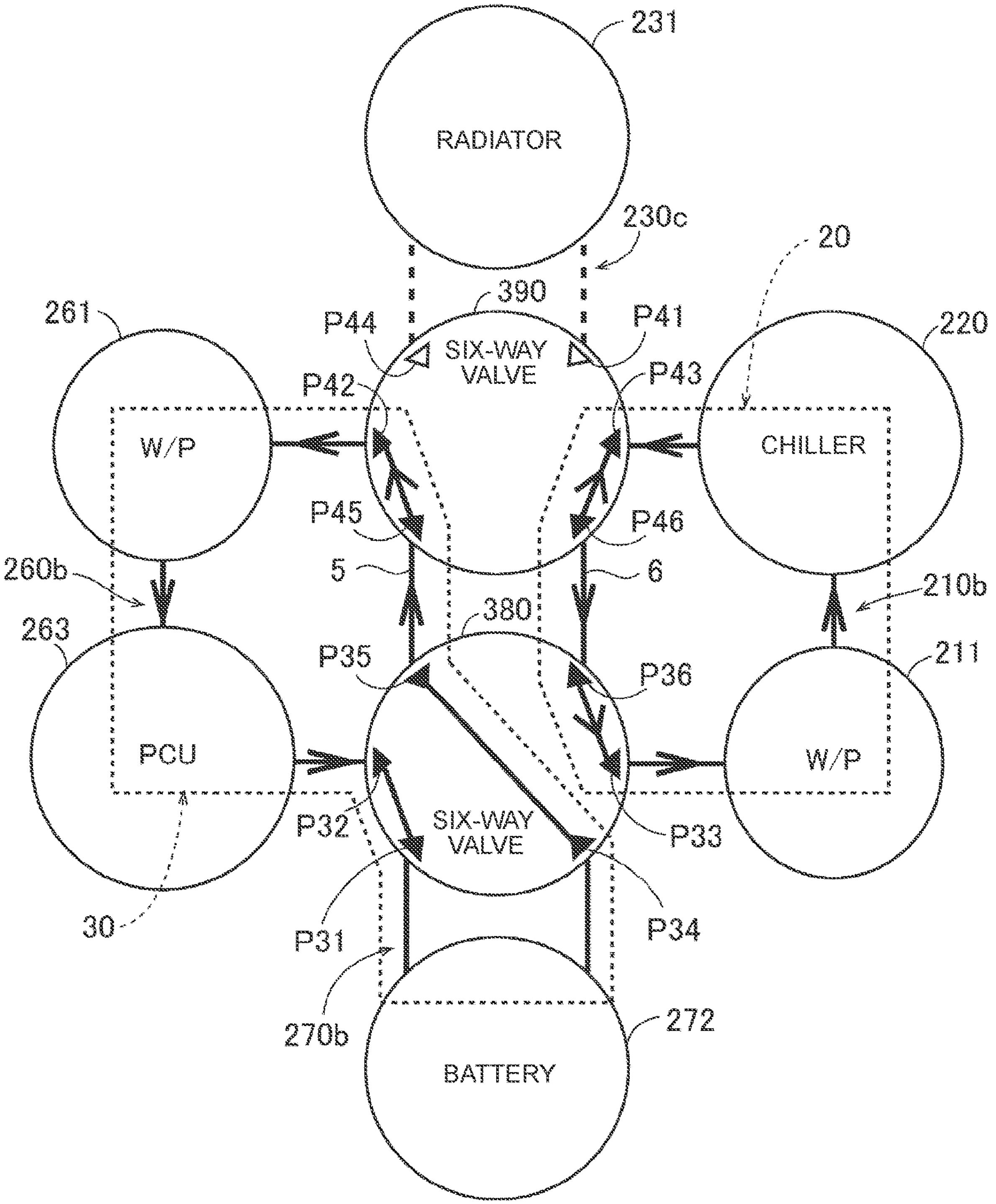
FIG. 5 is a diagram that shows a second communication pattern of the heat management circuit according to the first embodiment.
Figure 6:
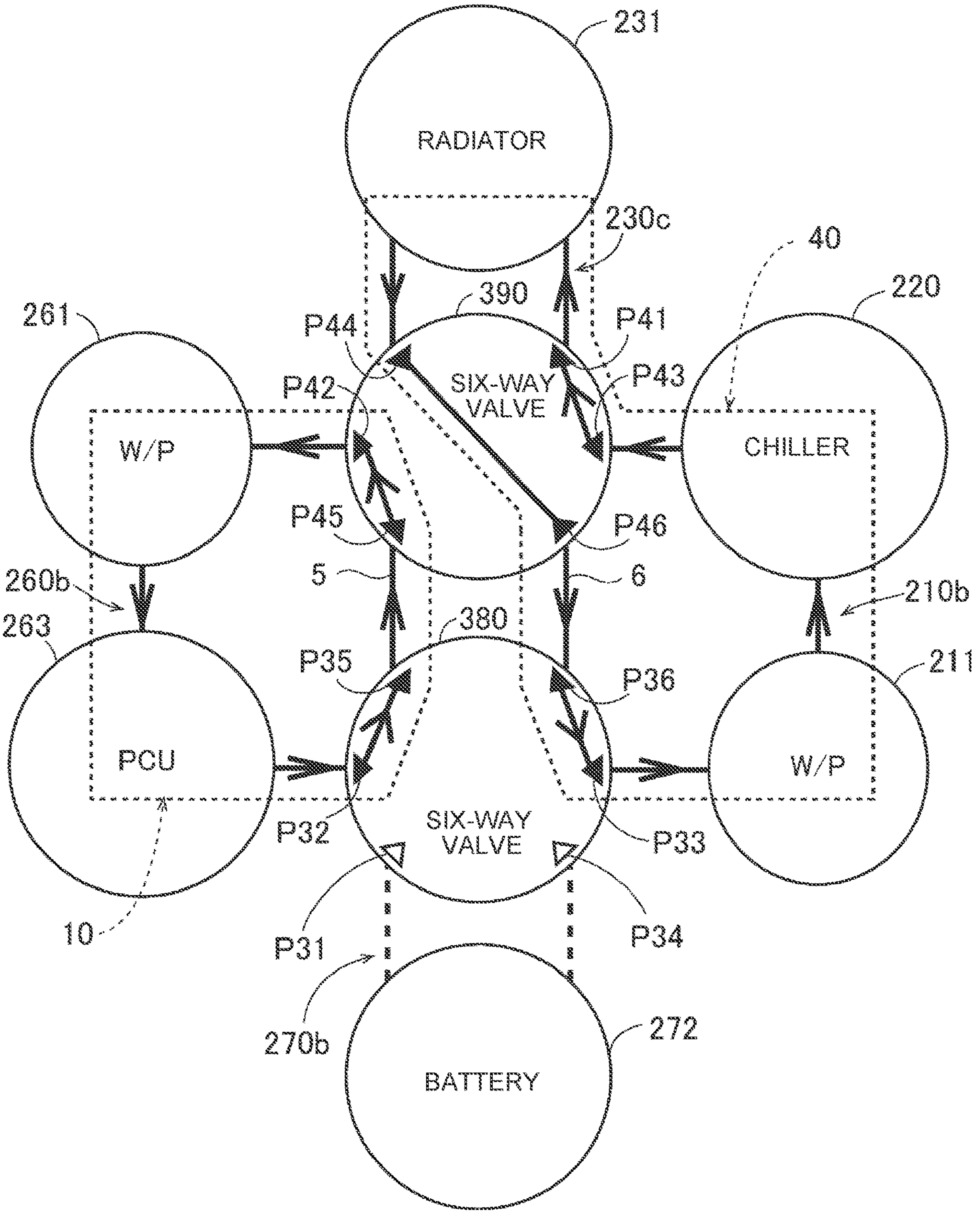
FIG. 6 is a diagram that shows a third communication pattern of the heat management circuit according to the first embodiment.

FIG. 4 to FIG. 6 are respectively conceptual views showing the outlines of first to third communication patterns of the heat management circuit 100, established by controlling the six-way valve 380 and the six-way valve 390. The first communication pattern is an example of the heating circuit according to the aspect of the disclosure.

In the first communication pattern shown in FIG. 4, a route communicating the port P32 with the port P35 and a route communicating the port P33 with the port P36 are established by the six-way valve 380.

In the first communication pattern, a route communicating the port P42 with the port P45 and a route communicating the port P43 with the port P46 are established by the six-way valve 390.

In the first communication pattern, a route (channel 5) communicating the port P35 with the port P45 and a route (channel 6) communicating the port P36 with the port P46 are established.

Thus, the channel 260*b* in which the PCU 263 and the like are provided, the six-way valve 380, and the six-way valve 390 are connected. As a result, a heat medium flows through a first closed circuit 10 including the water pump 261, the PCU 263, the six-way valve 380, the six-way valve 390, and the water pump 261.

The channel 210*b* in which the chiller 220 is provided, the six-way valve 380, and the six-way valve 390 are connected. As a result, a heat medium flows through a second closed circuit 20 including the water pump 211, the chiller 220, the six-way valve 390, the six-way valve 380, and the water pump 211.

In the example shown in FIG. 4, the radiator 231, the chiller 220, the battery 272, and the PCU 263 (and the oil cooler 264) are isolated and independent of one another.

At this time, no heat medium is circulating in the channel 270*b* in which the battery 272 is provided.

In the second communication pattern shown in FIG. 5, a route communicating the port P31 with the port P32, a route communicating the port P34 with the port P35, and the route communicating the port P33 with the port P36 are established by the six-way valve 380.

In the second communication pattern, the route communicating the port P42 with the port P45 and the route communicating the port P43 with the port P46 are established by the six-way valve 390.

In the second communication pattern, the route (channel 5) communicating the port P35 with the port P45 and the route (channel 6) communicating the port P36 with the port P46 are established.

Thus, the channel 260*b* in which the PCU 263 and the like are provided, the six-way valve 380, the six-way valve 390, and the channel 270*b* in which the battery 272 is provided are connected. As a result, a heat medium flows through a third closed circuit 30 including the water pump 261, the PCU 263, the six-way valve 380, the battery 272, the six-way valve 380, the six-way valve 390, and the water pump 261. At this time, the second closed circuit 20 is also formed.

In the third communication pattern shown in FIG. 6, the route communicating the port P32 with the port P35 and the route communicating the port P33 with the port P36 are established by the six-way valve 380.

In the third communication pattern, the route communicating the port P42 with the port P45, a route communicating the port P44 with the port P46, and a route communicating the port P41 with the port P43 are established by the six-way valve 390.

In the third communication pattern, the route (channel 5) communicating the port P35 with the port P45 and the route (channel 6) communicating the port P36 with the port P46 are established.

Thus, the channel 210*b* in which the chiller 220 is provided, the six-way valve 380, the six-way valve 390, and the channel 230*c* in which the radiator 231 is provided are connected. As a result, a heat medium flows through a fourth closed circuit 40 including the water pump 211, the chiller 220, the six-way valve 390, the radiator 231, the six-way valve 390, the six-way valve 380, and the water pump 211. At this time, the first closed circuit 10 is also formed.

Control Method for Heat Management Circuit

Figure 7:
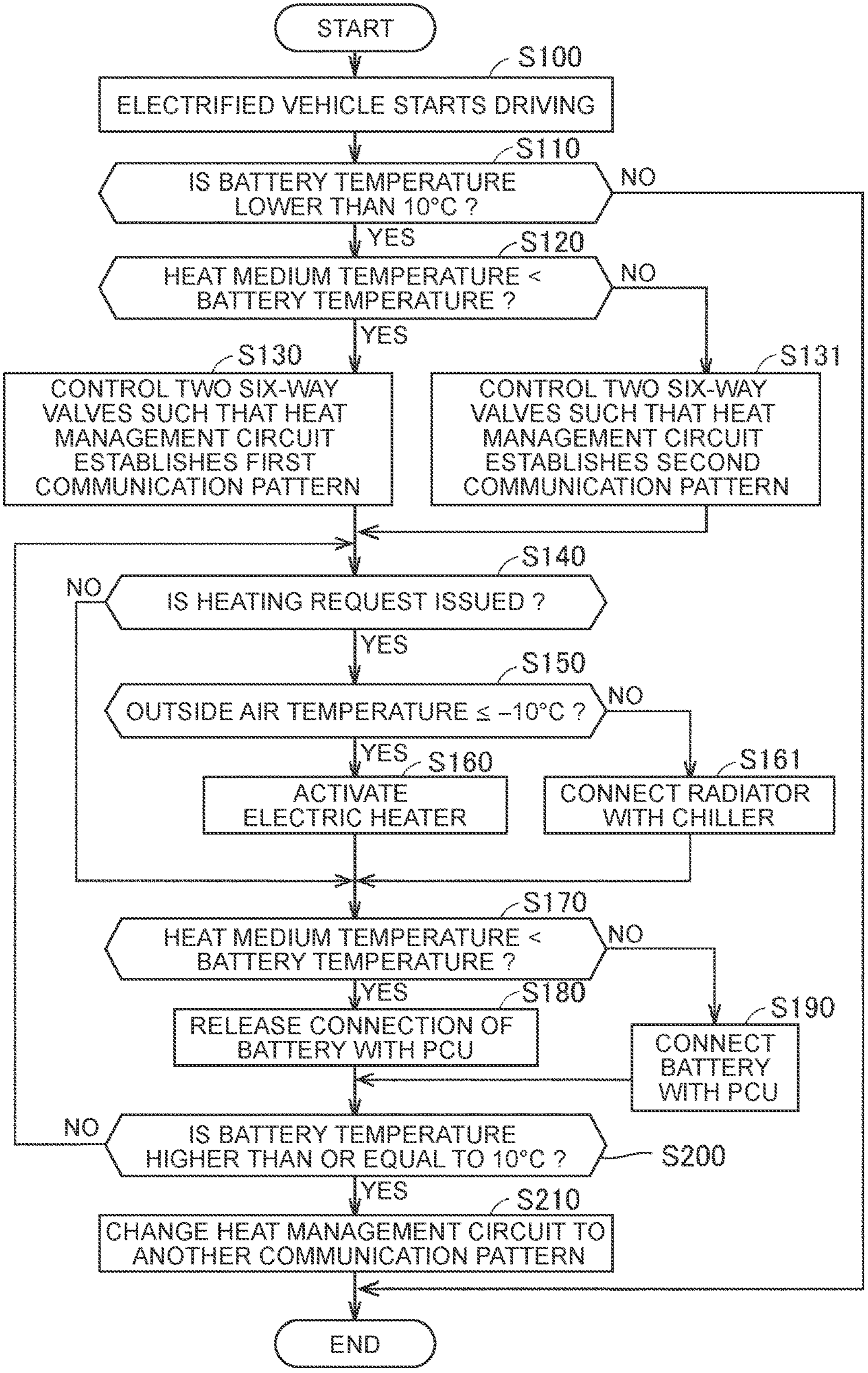
FIG. 7 is a flowchart that shows control of the heat management system according to the first embodiment.

A control method for the heat management system 1 will be described with reference to the flowchart of FIG. 7. This flowchart is just one example, and the aspect of the disclosure is not limited to this example.

In step S100, driving of the electrified vehicle 1*a* is started (the driving system is started up). Specifically, when a start button (not shown) of the electrified vehicle 1*a* is pressed, the PCU 263 and the like are driven, and the PCU 263 and the battery 272 are electrically connected (by an SMR (not shown)). Thus, a current is supplied from the PCU 263 to the battery 272. The ECU 500 detects that driving of the electrified vehicle 1*a* is started, by receiving a predetermined internal signal in the electrified vehicle 1*a*.

In step S110, the ECU 500 determines whether the temperature of the battery 272, detected by the battery temperature sensor 273, is lower than 10° C. When the temperature of the battery 272 is lower than 10° C. (Yes in S110), the process proceeds to step S120. When the temperature of the battery 272 is higher than or equal to 10° C. (No in S110), the process ends. The threshold in step S110 may be a numeric value other than 10° C.

In step S120, the ECU 500 determines whether the temperature of the heat medium, detected by the heat medium temperature sensor 266, is lower than the temperature of the battery 272, detected by the battery temperature sensor 273. When the temperature of the heat medium is lower than the temperature of the battery 272 (Yes in S120), the process proceeds to step S130. When the temperature of the heat medium is higher than or equal to the temperature of the battery 272 (No in S120), the process proceeds to step S131.

In step S130, the ECU 500 controls the six-way valve 380 and the six-way valve 390 such that the heat management circuit 100 establishes the first communication pattern shown in FIG. 4. At this time, the output (flow rate) of the water pump 261 may be set relatively high (to, for example, an upper limit). Subsequently, the process proceeds to step S140.

In step S131, the ECU 500 controls the six-way valve 380 and the six-way valve 390 such that the heat management circuit 100 establishes the second communication pattern shown in FIG. 5. Subsequently, the process proceeds to step S140.

In step S140, the ECU 500 determines whether there is a request to activate heating from a user of the electrified vehicle 1*a*. When there is the request (Yes in S140), the process proceeds to step S150. When there is no request (No in S140), the process proceeds to step S170. The ECU 500 may determine that there is the request, based on a signal to be sent to the ECU 500 when the user presses down a button to activate heating.

In step S150, the ECU 500 determines whether the outside air temperature detected by the outside air temperature sensor 700 is lower than or equal to −10° C. When the outside air temperature is lower than or equal to −10° C. (Yes in S150), the process proceeds to step S160. When the outside air temperature is higher than −10° C. (No in S150), the process proceeds to step S161. A threshold that is −10° C. is set based on the fact that a heat medium is cooled to about −10° C. when expanded by the electromagnetic valve 246 (expansion valve) (see FIG. 3). The threshold "−10° C." is an example of the predetermined threshold according to the aspect of the disclosure.

In step S160, the ECU 500 activates the electric heater 212. At this time, the ECU 500 may adjust the output of the electric heater 212 based on the temperature of heating set by the user.

In step S161, the ECU 500 controls the six-way valve 380 and the six-way valve 390 such that a channel circuit in which the radiator 231 and the chiller 220 are connected is formed. When, for example, the process of step S161 is executed in a state where the heat management circuit 100 is in the first communication pattern (see FIG. 4), the heat management circuit 100 is switched to the third communication pattern shown in FIG. 6. Although not shown in the drawing, when the process of step S161 is executed in a state where the heat management circuit 100 is in the second communication pattern (see FIG. 5), the six-way valve 380 and the six-way valve 390 are controlled such that the third closed circuit 30 (see FIG. 5) or the fourth closed circuit 40 (see FIG. 6) is formed. In step S161, when the channel circuit in which the radiator 231 and the chiller 220 are connected is already formed, the ECU 500 maintains the state where the radiator 231 and the chiller 220 are connected.

In step S170, the ECU 500 determines whether the temperature of the heat medium, detected by the heat medium temperature sensor 266, is lower than the temperature of the battery 272, detected by the battery temperature sensor 273. When the temperature of the heat medium is lower than the temperature of the battery 272 (Yes in S170), the process proceeds to step S180. When the temperature of the heat medium is higher than or equal to the temperature of the battery 272 (No in S170), the process proceeds to step S190.

In step S180, the ECU 500 controls the six-way valve 380 and the six-way valve 390 such that connection of the battery 272 (channel 270*b*) with the PCU 263 (channel 260*b*) is released. When, for example, the process of step S180 is executed in a state where the heat management circuit 100 is in the second communication pattern (see FIG. 5), the heat management circuit 100 is switched to the first communication pattern (see FIG. 4). In step S180, when connection of the battery 272 (channel 270*b*) with the PCU 263 (channel 260*b*) is already released, the ECU 500 maintains the state where connection of the battery 272 (channel 270*b*) with the PCU 263 (channel 260*b*) is released. After that, the process proceeds to step S200.

In step S190, the ECU 500 controls the six-way valve 380 and the six-way valve 390 such that a channel circuit in which the battery 272 (channel 270*b*) and the PCU 263 (channel 260*b*) are connected is formed. When, for example, the process of step S190 is executed in a state where the heat management circuit 100 is in the first communication pattern (see FIG. 4), the heat management circuit 100 is switched to the second communication pattern (see FIG. 5). In step S190, when the battery 272 (channel 270*b*) and the PCU 263 (channel 260*b*) are already connected, the ECU 500 maintains the state where the battery 272 (channel 270*b*) and the PCU 263 (channel 260*b*) are connected. After that, the process proceeds to step S200.

In step S200, the ECU 500 determines whether the temperature of the battery 272, detected by the battery temperature sensor 273, is higher than or equal to 10° C. When the temperature of the battery 272 is higher than or equal to 10° C. (Yes in S200), the process proceeds to step S210. When the temperature of the battery 272 is lower than 10° C. (No in S200), the process proceeds to step S140. The threshold in step S200 may be a numeric value other than 10° C. as long as the numeric value is higher than or equal to the threshold in step S110.

In step S210, the ECU 500 changes the heat management circuit 100 to another communication pattern (for example, a communication pattern suitable for driving of the electrified vehicle 1*a*) by controlling the six-way valve 380 and the six-way valve 390. After that, the process ends.

As described above, in the first embodiment, the ECU 500, during heating control of the battery 272, controls the six-way valve 380 and the six-way valve 390 such that the battery 272, the PCU 263 (oil cooler 264), the radiator 231, and the chiller 220 are isolated and independent of one another. Thus, it is possible to reduce removal of heat, generated by self-heating of the battery 272, and heat due to heat generation of the PCU 263 and the like, by the radiator 231 and the chiller 220. As a result, it is possible to effectively use heat generated from the PCU 263 and the like and efficiently heat the battery 272 by itself.

Second Embodiment

A second embodiment differs from the first embodiment that adopts the six-way valve 380 and the six-way valve 390, in that a ten-way valve is adopted. Like reference signs denote the same components to those of the first embodiment, and the description will not be repeated.

Overall Configuration

Figure 8:
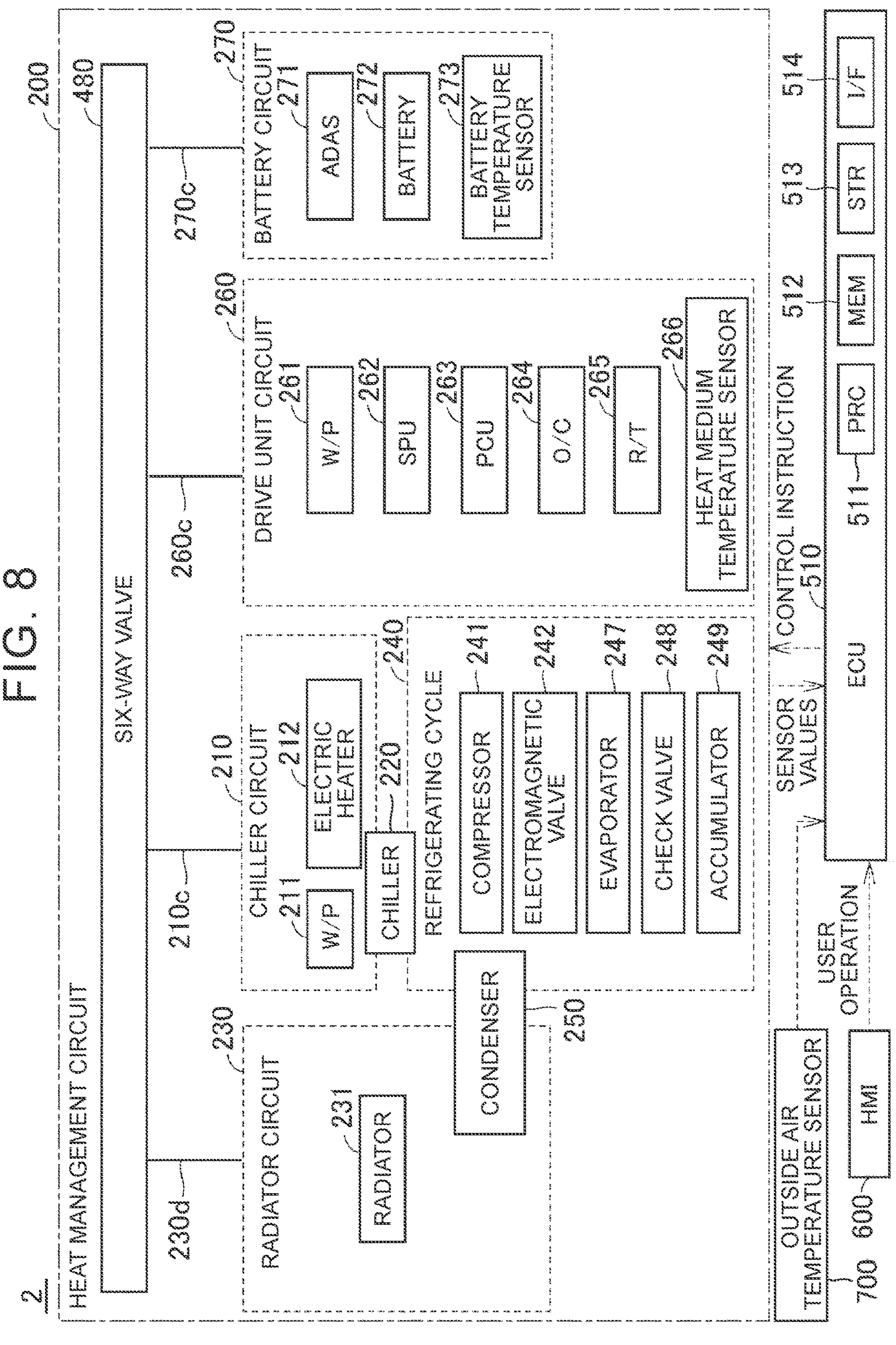
FIG. 8 is a block diagram that shows the configuration of a heat management system according to a second embodiment.

FIG. 8 is a block diagram that shows an example of the overall configuration of a heat management system 2 according to the second embodiment of the disclosure. The heat management system 2 differs from the heat management system 1 (see FIG. 2) according to the first embodiment in that a heat management circuit 200 instead of the heat management circuit 100 and an ECU 510 instead of the ECU 500 are provided.

The heat management circuit 200 includes, for example, the chiller circuit 210, the chiller 220, the radiator circuit 230, the refrigerating cycle 240, the condenser 250, the drive unit circuit 260, the battery circuit 270, and a ten-way valve 480. The ten-way valve 480 is an example of the switching unit according to the aspect of the disclosure.

The chiller 220 is provided in a channel 210*c* of the chiller circuit 210. The channel 210*c* is provided so as to connect the chiller circuit 210 with the ten-way valve 480. The channel 210*c* is an example of the fourth channel according to the aspect of the disclosure.

The radiator 231 is provided in a channel 230*d*. The channel 230*d* is provided so as to connect the radiator 231 with the ten-way valve 480. The channel 230*d* includes a bypass channel 230*e* (see FIG. 9). The bypass channel 230*e* is provided so as to connect a part between the radiator 231 and the ten-way valve 480 with the ten-way valve 480. The channel 230*d* is an example of the third channel according to the aspect of the disclosure.

The water pump 261, the SPU 262, the PCU 263, the oil cooler 264, and the reservoir tank 265 are provided in a channel 260*c* of the drive unit circuit 260. The channel 260*c* is provided so as to connect the drive unit circuit 260 with the ten-way valve 480. The channel 260*c* is an example of the second channel according to the aspect of the disclosure.

The battery 272 is provided in a channel 270*c* of the battery circuit 270. The channel 270*c* is provided so as to connect the battery circuit 270 with the ten-way valve 480. The channel 270*c* includes a bypass channel 270*d* (see FIG. 9). The bypass channel 270*d* is provided so as to connect a part between the ADAS 271 and the battery 272 with the ten-way valve 480. The channel 270*c* is an example of the first channel according to the aspect of the disclosure.

The ECU 510 controls the heat management circuit 200. The ECU 510 includes a processor 511, a memory 512, a storage 513, and an interface 514.

Configuration of Heat Management Circuit

Figure 9:
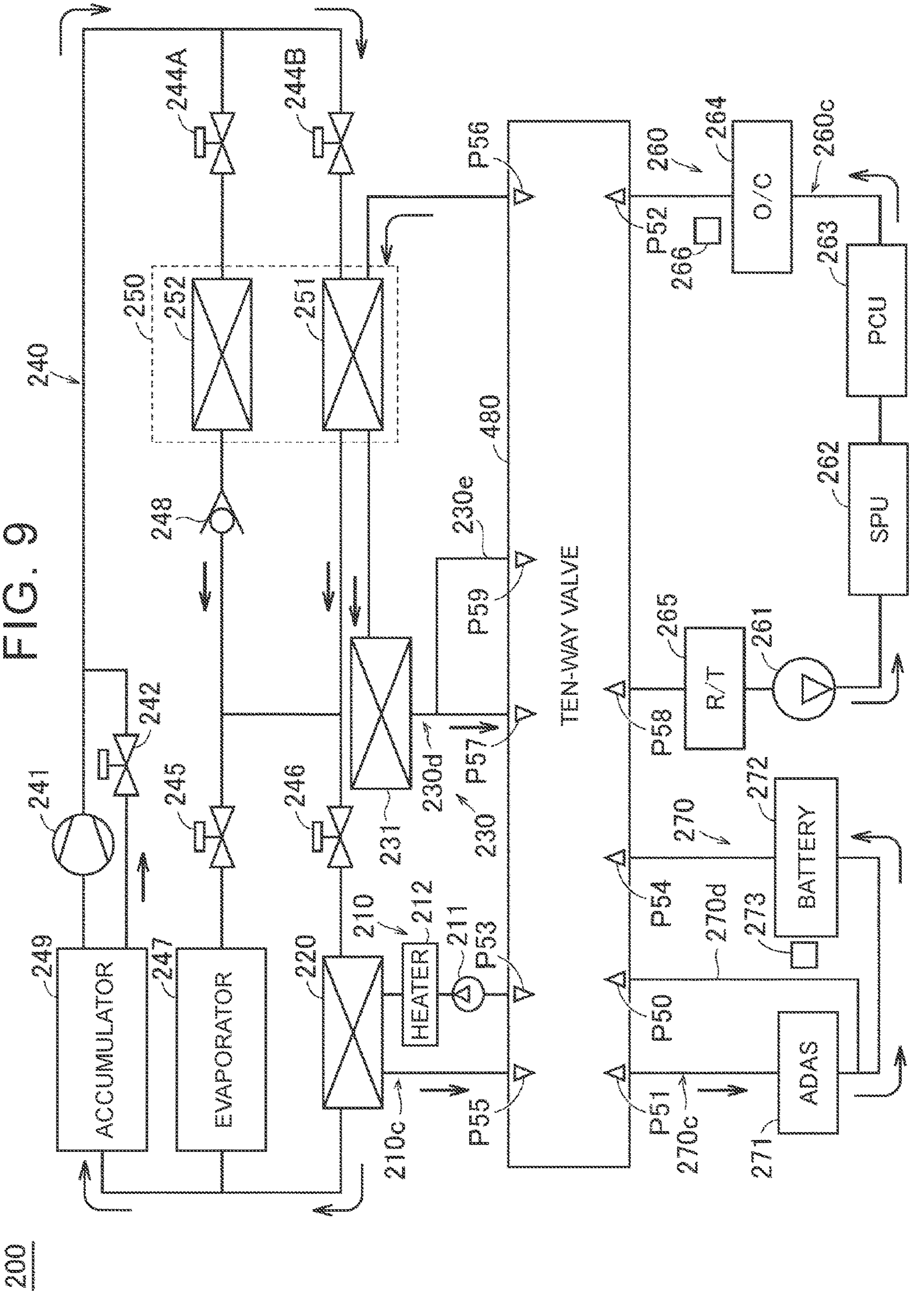
FIG. 9 is a block diagram that shows the detailed configuration of the heat management system according to the second embodiment.

FIG. 9 is a block diagram that shows an example of the configuration of the heat management circuit 200 according to the second embodiment. As shown in FIG. 9, the ten-way valve 480 includes 10 ports P50, P51, P52, P53, P54, P55, P56, P57, P58, P59.

A heat medium circulating in the chiller circuit 210 flows along a route passing through the ten-way valve 480 (port P53), the water pump 211, the electric heater 212, the chiller 220, and the ten-way valve 480 (port P55).

A heat medium circulating in the radiator circuit 230 flows through one or both of a first route and a second route. The first route passes through the ten-way valve 480 (port P56), the water-cooled condenser 251, the radiator 231, and the ten-way valve 480 (port P57). The second route passes through the ten-way valve 480 (port P59), the bypass channel 230*e*, and the ten-way valve 480 (port P57).

A heat medium (coolant) circulating in the drive unit circuit 260 flows along a route that passes through the ten-way valve 480 (port P58), the reservoir tank 265, the water pump 261, the SPU 262, the PCU 263, the oil cooler 264, and the ten-way valve 480 (port P52).

A heat medium (coolant) circulating in the battery circuit 270 flows through one or both of a first route and a second route. The first route passes through the ten-way valve 480 (port P51), the ADAS 271, the battery 272, and the ten-way valve 480 (port P54). The second route passes through the ten-way valve 480 (port P51), the ADAS 271, the bypass channel 270*d*, and the ten-way valve 480 (port P50).

Communication Pattern

FIG. 10A to FIG. 12 are respectively conceptual views showing the outlines of first to third communication patterns established by the ten-way valve 480. The first communication pattern is an example of the heating circuit according to the aspect of the disclosure.

In the first communication pattern (see FIG. 10A and FIG. 10B), a route communicating the port P50 with the port P58 is established by an internal channel 481 of the ten-way valve 480. In the first communication pattern, a route communicating the port P51 with the port P52 is established by an internal channel 482 of the ten-way valve 480. In the first communication pattern, a route communicating the port P55 with the port P59 is established by an internal channel 483 of the ten-way valve 480. In the first communication pattern, a route communicating the port P53 with the port P57 is established by an internal channel 484 of the ten-way valve 480.

Figure 10A:
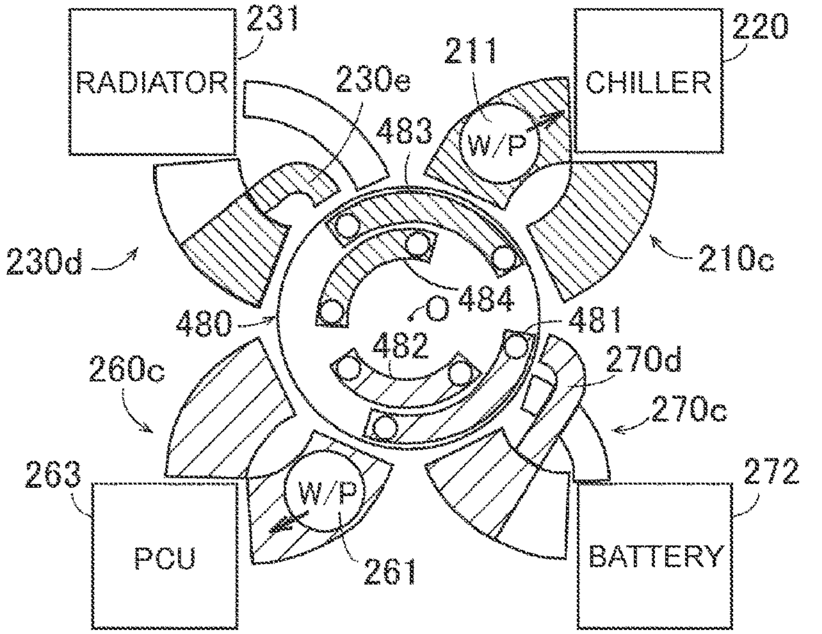
FIG. 10A is a diagram that shows a first communication pattern of a heat management circuit according to the second embodiment.
Figure 10B:
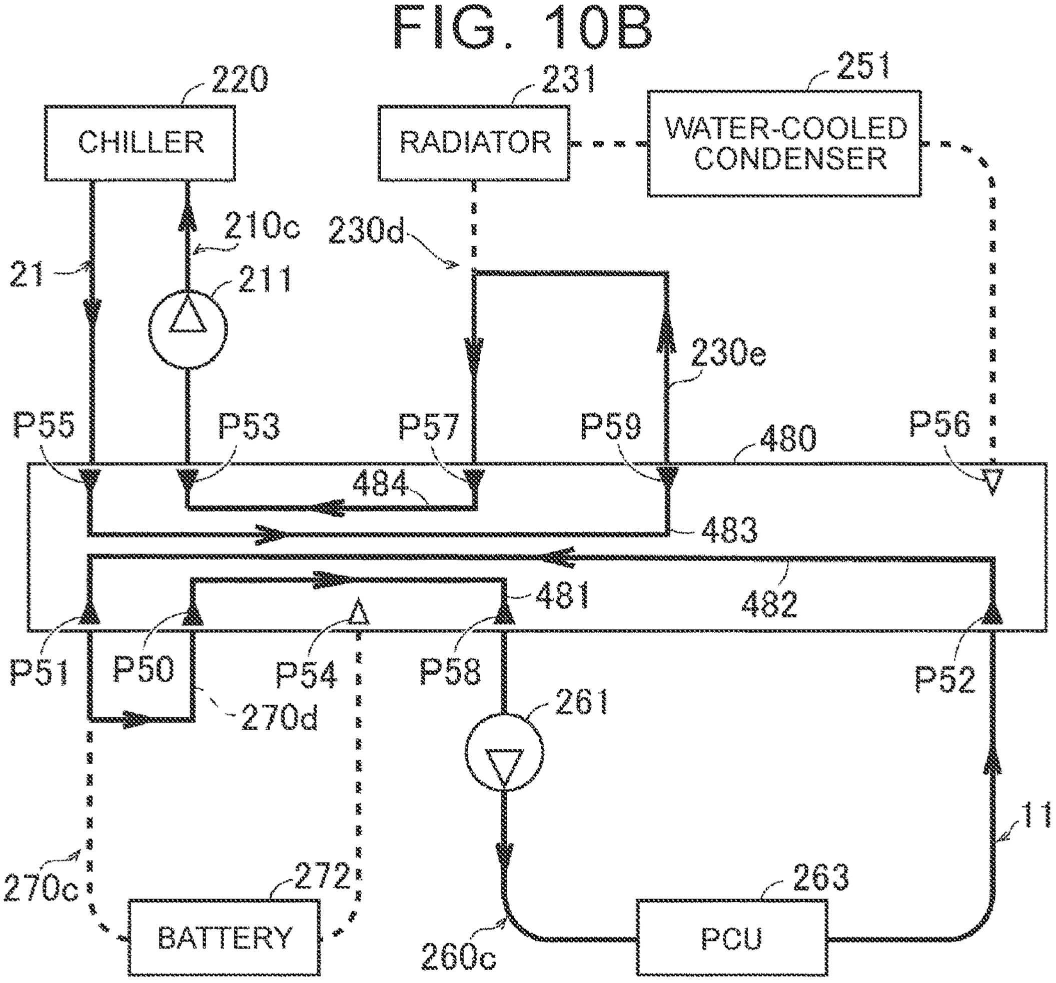
FIG. 10B is a block diagram that shows the schematic configuration of the heat management circuit corresponding to FIG. 10A.

Thus, as shown in FIG. 10B, a heat medium flows through a first closed circuit 11 including the water pump 261, the PCU 263, the ten-way valve 480, the bypass channel 270*d*, the ten-way valve 480, and the water pump 261. A heat medium flows through a second closed circuit 21 including the water pump 211, the chiller 220, the ten-way valve 480, the bypass channel 230*e*, the ten-way valve 480, and the water pump 211.

As a result, in the example shown in FIG. 10A and FIG. 10B, the battery 272, the PCU 263 (oil cooler 264), the radiator 231, and the chiller 220 are isolated and independent of one another. At this time, no heat medium is circulating in the channel 270*c* in which the battery 272 is provided.

Figure 11A:
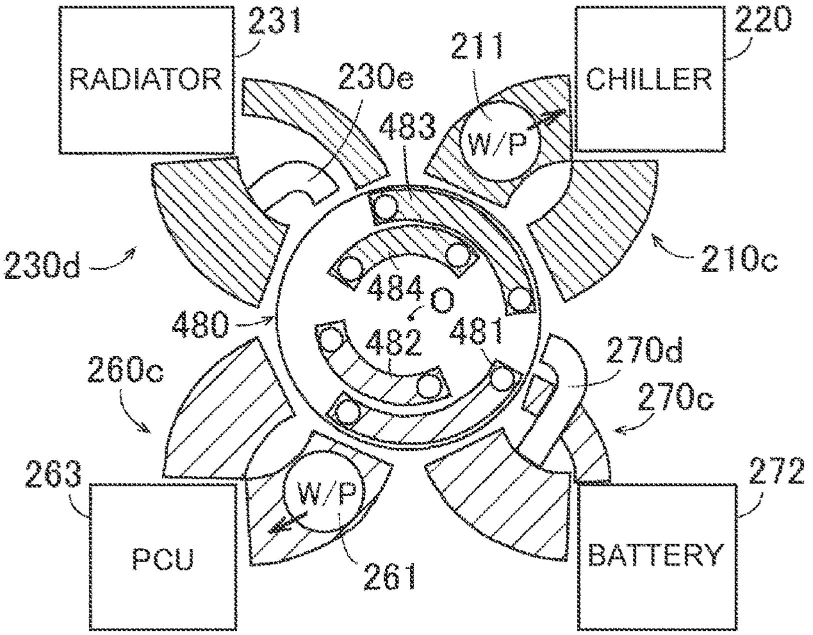
FIG. 11A is a diagram that shows a second communication pattern of the heat management circuit according to the second embodiment.

FIG. 11A shows a second communication pattern in a state where a flow route of the internal channel 481 is switched from the state of FIG. 10A.

Figure 11B:
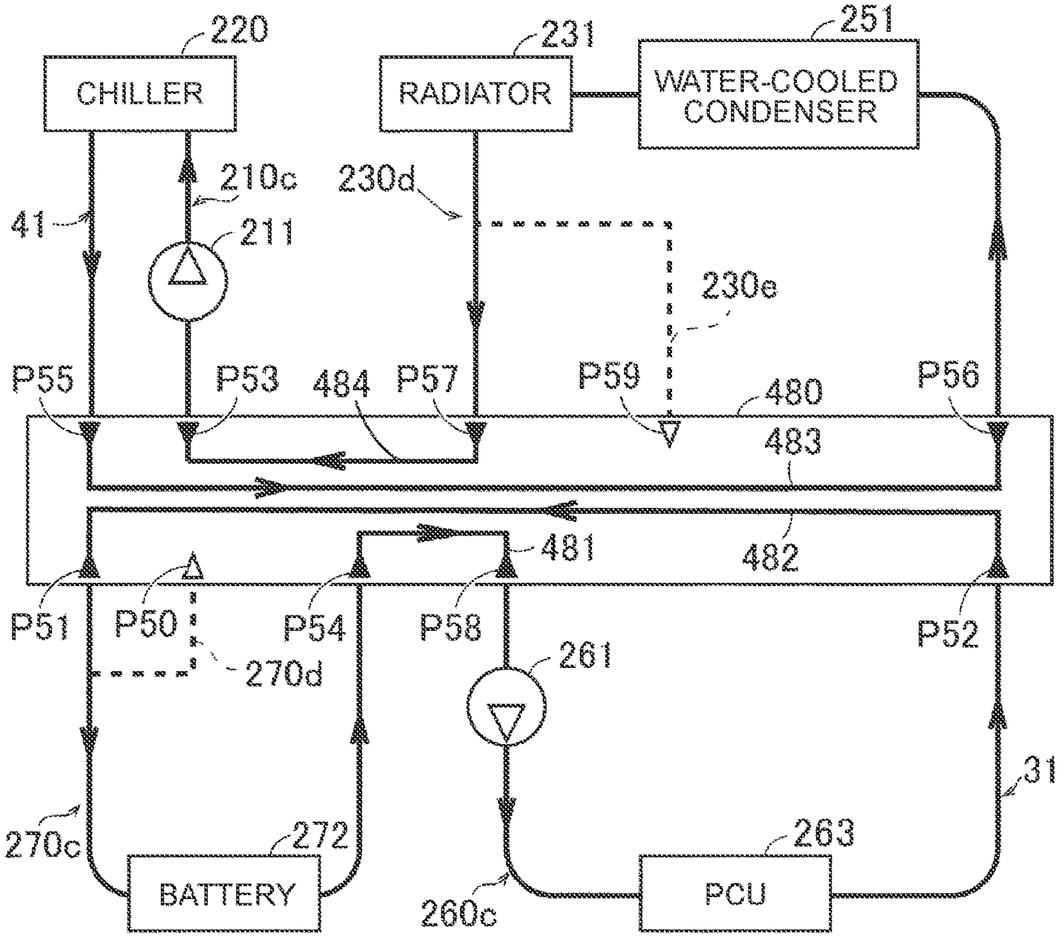
FIG. 11B is a block diagram that shows the schematic configuration of the heat management circuit corresponding to FIG. 11A.

As shown in FIG. 11B, a heat medium flows through a third closed circuit 31 including the water pump 261, the PCU 263, the ten-way valve 480, the battery 272, the ten-way valve 480, and the water pump 261. A heat medium flows through a fourth closed circuit 41 including the water pump 211, the chiller 220, the ten-way valve 480, the water-cooled condenser 251, the radiator 231, the ten-way valve 480, and the water pump 211.

As described above, it is possible to easily switch the communication pattern of the heat management circuit 200 by switching the flow route among the internal channels 481, 482, 483, 484.

Control Method for Heat Management Circuit

Figure 12:
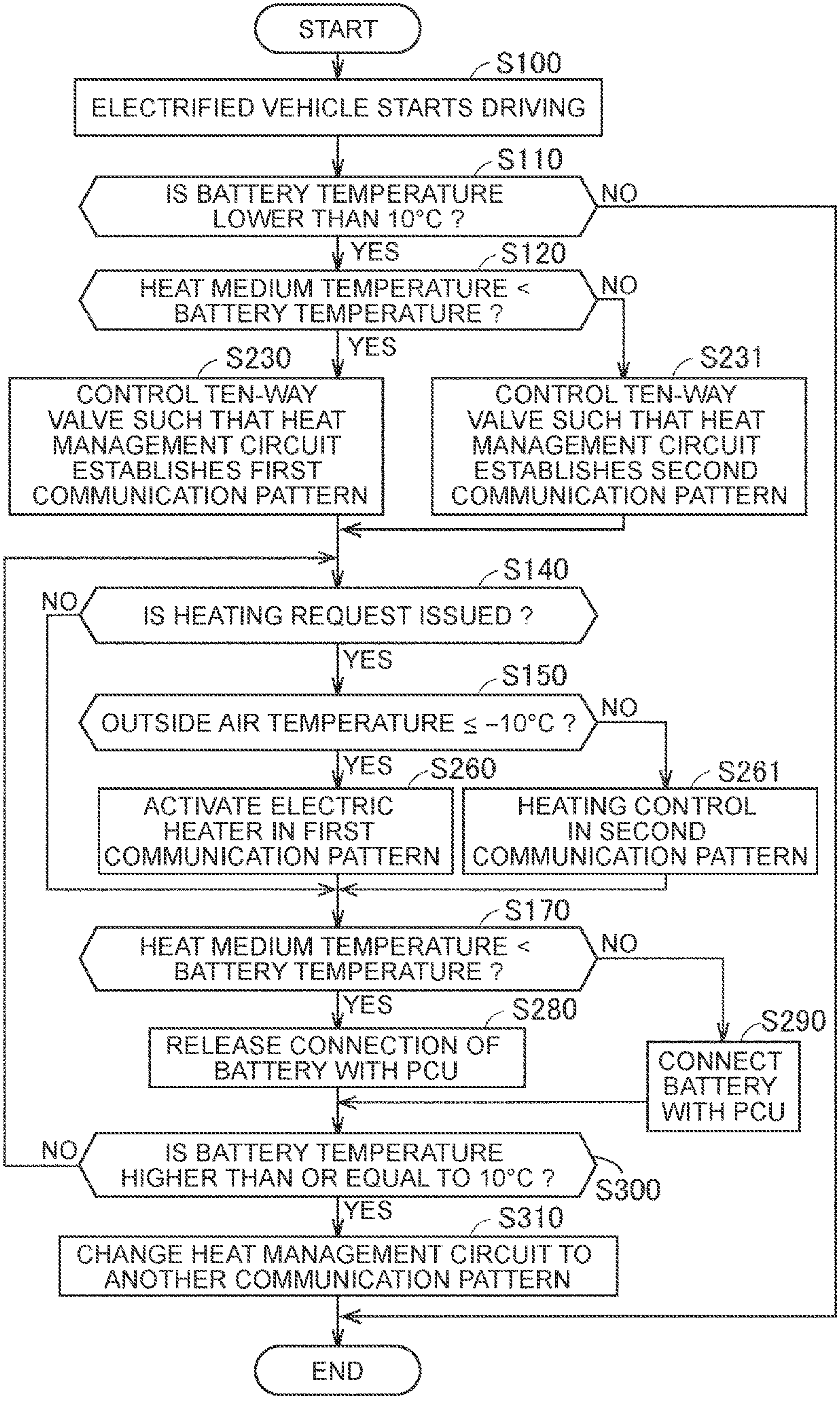
FIG. 12 is a flowchart that shows control of the heat management system according to the second embodiment.

A control method for the heat management system 2 will be described with reference to the flowchart of FIG. 12. The flow shown in FIG. 12 is only illustrative, and control in the aspect of the disclosure is not limited to the example shown in FIG. 12. The description of similar steps to those of the control flow in the first embodiment is simplified or omitted.

When the determination is affirmative in step S120, the process proceeds to step S230. When the determination is negative in step S120, the process proceeds to step S231. In step S230, the ECU 510 controls the ten-way valve 480 such that the heat management circuit 200 establishes the first communication pattern shown in FIG. 10A and FIG. 10B. At this time, the output (flow rate) of the water pump 261 may be set relatively high (to, for example, an upper limit). Subsequently, the process proceeds to step S140.

In step S231, the ECU 510 controls the ten-way valve 480 such that the heat management circuit 200 establishes the second communication pattern shown in FIG. 11A and FIG. 11B. Subsequently, the process proceeds to step S140.

When the determination is affirmative in step S150, the process proceeds to step S260. When the determination is negative in step S150, the process proceeds to step S261. In step S260, the ECU 510 sets the heat management circuit 200 to the first communication pattern (see FIG. 10A and FIG. 10B) and activates the electric heater 212. In step S261, the ECU 510 sets the heat management circuit 200 to the second communication pattern (see FIG. 11A and FIG. 11B) and activates heating by using the radiator 231 and the chiller 220. After that, the process proceeds to step S170.

When the determination is affirmative in step S170, the process proceeds to step S280. In step S280, the ECU 510 controls the ten-way valve 480 such that connection of the battery 272 (channel 270*b*) with the PCU 263 (channel 260*b*) is released. When, for example, the process of step S280 is executed in a state where the heat management circuit 200 is in the second communication pattern (see FIG. 11A and FIG. 11B), the heat management circuit 200 is switched to the first communication pattern (see FIG. 10A and FIG. 10B). In step S280, when connection of the battery 272 (channel 270*c*) with the PCU 263 (channel 260*c*) is already released, the ECU 510 maintains the state where connection of the battery 272 (channel 270*c*) with the PCU 263 (channel 260*c*) is released. After that, the process proceeds to step S300.

When the determination is negative in step S170, the process proceeds to step S290. In step S290, the ECU 510 controls the ten-way valve 480 such that a channel circuit in which the battery 272 and the PCU 263 are connected is formed. When, for example, the process of step S290 is executed in a state where the heat management circuit 200 is in the first communication pattern (see FIG. 10A and FIG. 10B), the heat management circuit 200 is switched to the second communication pattern (see FIG. 11A and FIG. 11B). In step S290, when the channel circuit in which the battery 272 and the PCU 263 are connected is already formed, the ECU 510 maintains the state where the battery 272 and the PCU 263 are connected.

When the determination is affirmative in step S300, the process proceeds to step S310. In step S310, the ECU 510 changes the heat management circuit 200 to another communication pattern (for example, a communication pattern suitable for driving of the electrified vehicle 1*a*) by controlling the ten-way valve 480. After that, the process ends.

The remaining configuration and advantageous effects of the second embodiment are similar to those of the first embodiment.

In the first and second embodiments, an example in which heating control of the battery is executed when the electrified vehicle 1*a* starts driving (when the driving system starts up) has been described; however, the disclosure is not limited thereto. The heating control may be started based on the fact that time a predetermined period of time (for example, 30 minutes) before the next scheduled driving start time has come. In these cases, control that does not cause the motor of the electrified vehicle to generate torque (for example, control to pass only one-phase current of three-phase currents to be supplied to the motor) may be executed.

Figure 13:
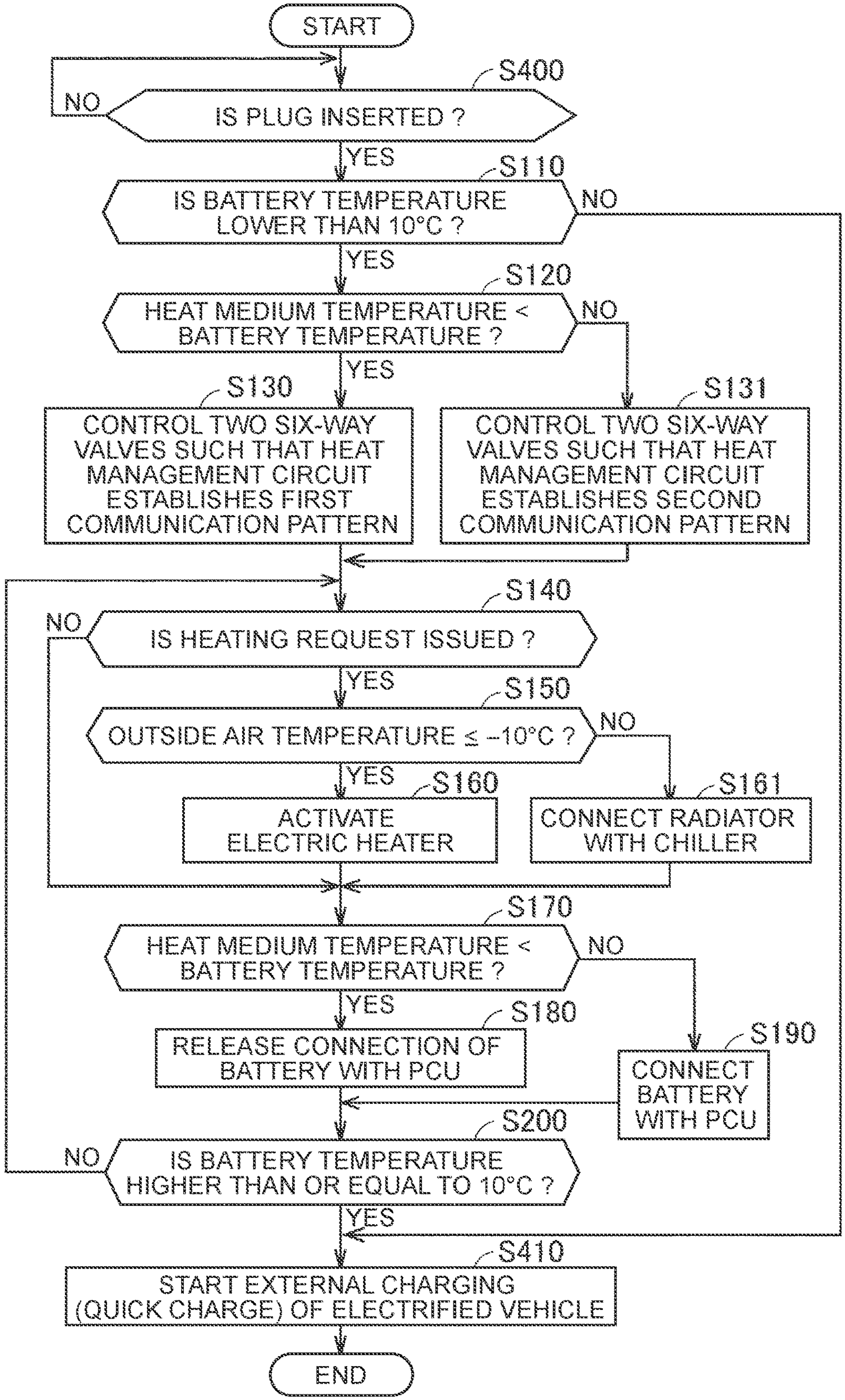
FIG. 13 is a flowchart that shows control of a heat management system according to a modification of the first and second embodiments.

As shown in FIG. 13, heating control may be executed when external charging (for example, quick charge) for charging the battery with charging power supplied from a charging station (not shown) outside the electrified vehicle is started. For example, the process proceeds to step S110 in response to the fact that the ECU 500 detects insertion of a charging plug in step S400. When the ECU 500 determines in step S200 or step S110 that the temperature of the battery 272 is higher than or equal to 10° C., the process proceeds to step S410. The temperature 10° C. is an example of the predetermined temperature according to the aspect of the disclosure. In step S410, the ECU 500 starts controlling external charging (quick charge). FIG. 13 shows an example in which battery heating control is activated in response to plug insertion. Even before plug insertion, battery heating control may be started in response to, for example, the fact that time a predetermined period of time (for example, 10 minutes) before scheduled external charging start time (charging power supply start time) comes. FIG. 13 typically shows an example in which the above control is applied to the first embodiment. Alternatively, the above control may be applied to the second embodiment. The heating control may be executed when normal charge (low-rate charge having a lower rate of charge than quick charge) is started.

In the first and second embodiments, an example in which the heat management system is provided in the electrified vehicle has been described; however, the disclosure is not limited thereto. The heat management system may be provided in an electrical apparatus different from the electrified vehicle (for example, a stationary electrical storage device).

In the first and second embodiments, an example in which, when the temperature of the channel (260*b*, 260*c*) in which the PCU 263 and the like are provided is lower than the temperature of the battery 272, heating control of the battery 272 is executed by establishing the first communication pattern has been described; however, the disclosure is not limited thereto. When the temperature of the channel is higher than or equal to the temperature of the battery 272, heating control of the battery 272 may be executed by establishing the first communication pattern.

In the first and second embodiments, an example in which, when there is a heating request and the outside air temperature is lower than a predetermined threshold (−10° C.), heating control of the battery 272 is executed in a state where the first communication pattern is established; however, the disclosure is not limited thereto. When, for example, there is a heating request and the outside air temperature is higher than or equal to a predetermined threshold, heating control of the battery 272 may be executed in a state where the first communication pattern is established.

In the first and second embodiments, an example in which heating control of the battery is executed when the electrified vehicle 1*a* starts driving (when the driving system starts up) has been described; however, the disclosure is not limited thereto. For example, even not the time when the electrified vehicle 1*a* starts driving (when the driving system starts up), when the temperature of the battery becomes lower than a predetermined threshold (in the embodiments, 10° C.), the heating control may be executed. In this case, the ECU may acquire a detected value of the temperature of the battery at intervals of a predetermined period (for example, one hour). The battery may be heated by passing a current larger than usual to the battery in a state where the first communication pattern is established while the electrified vehicle 1*a* is driving.

In the second embodiment, the first communication pattern (see FIG. 10A and FIG. 10B) using the ten-way valve 480 has been described. Alternatively, the battery may be heated with a circuit other than the circuit shown in FIG. 10A and FIG. 10B. For example, a heat management circuit shown in FIG. 14A and FIG. 14B may be formed.

Figure 14A:
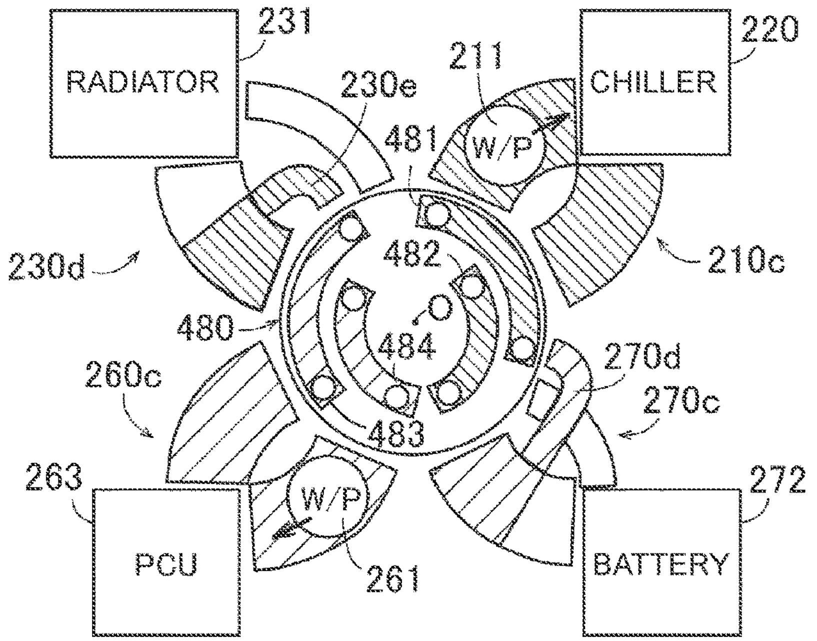
FIG. 14A is a diagram that shows the configuration of a heat management circuit according to a first modification of the second embodiment.
Figure 14B:
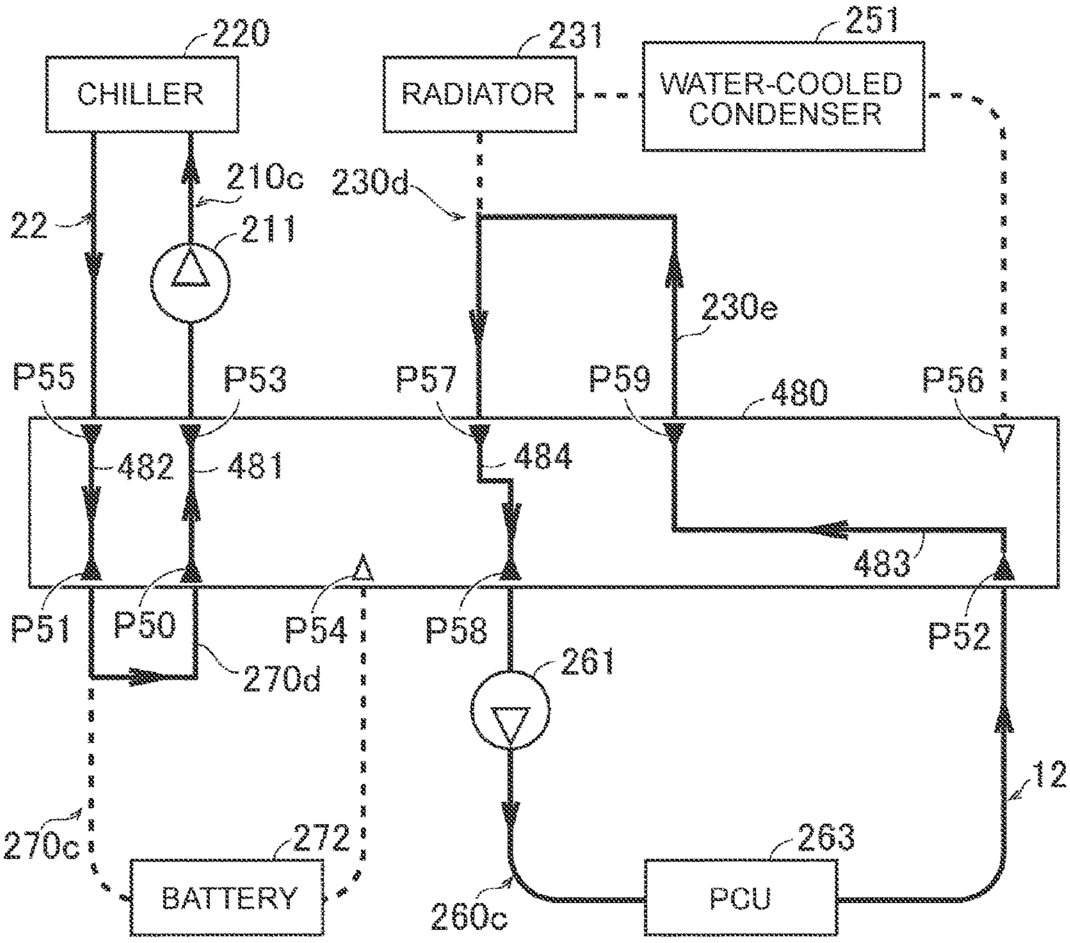
FIG. 14B is a block diagram that shows the schematic configuration of the heat management circuit corresponding to FIG. 14A.

In the communication pattern shown in FIG. 14A and FIG. 14B, a route communicating the port P50 with the port P53 is established by an internal channel 481 of the ten-way valve 480. In the communication pattern, a route communicating the port P51 with the port P55 is established by an internal channel 482 of the ten-way valve 480. In the communication pattern, a route communicating the port P52 with the port P59 is established by an internal channel 483 of the ten-way valve 480. In the communication pattern, a route communicating the port P57 with the port P58 is established by an internal channel 484 of the ten-way valve 480.

Thus, a closed circuit 12 including the water pump 261, the PCU 263, the port P52, the port P59, the bypass channel

230*e*, the port P57, the port P58, and the water pump 261 is formed. A closed circuit 22 including the water pump 211, the chiller 220, the port P55, the port P51, the bypass channel 270*d*, the port P50, and the water pump 211 is established.

Figure 15:
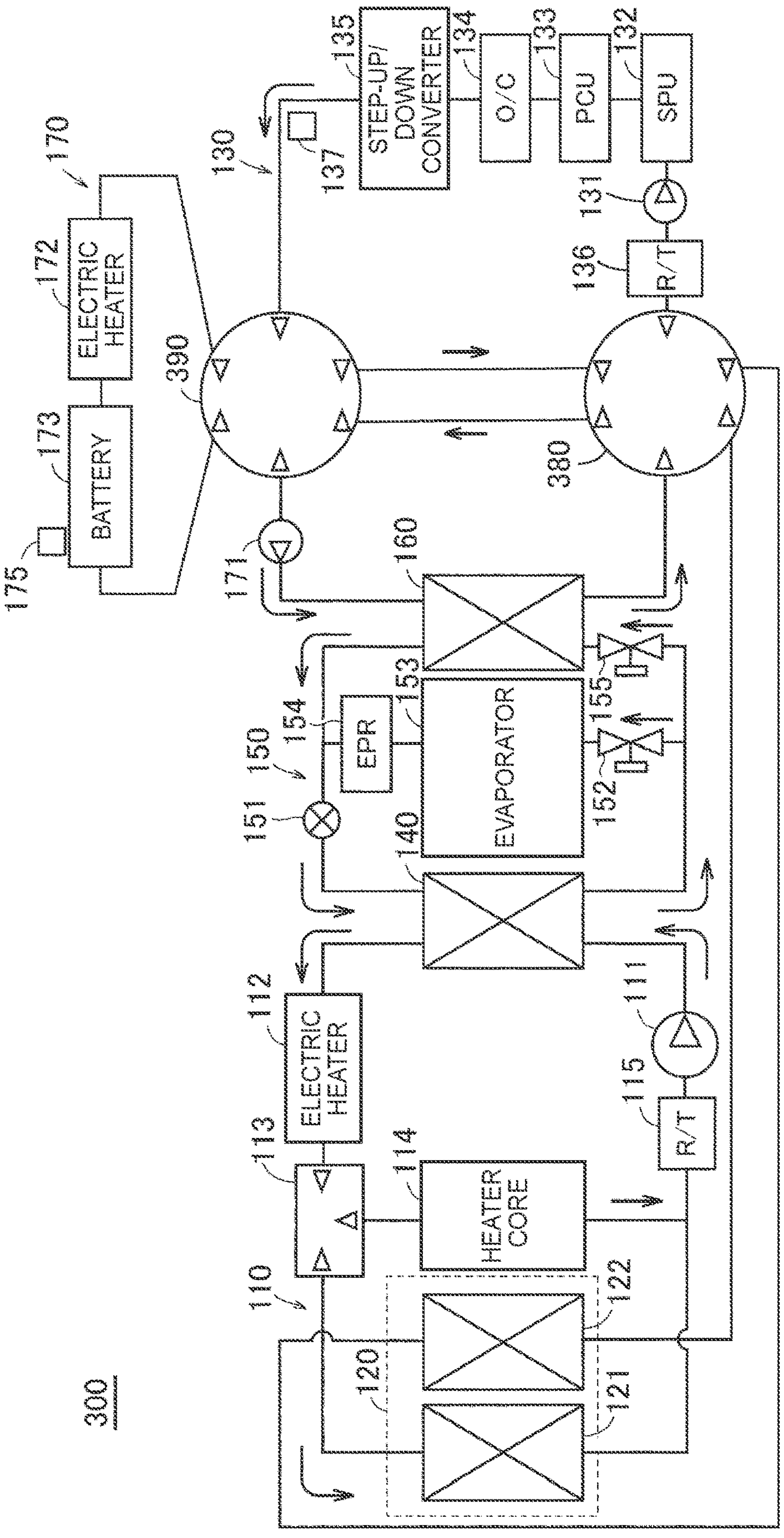
FIG. 15 is a block diagram that shows the configuration of a heat management system according to a modification of the first embodiment.
Figure 16:
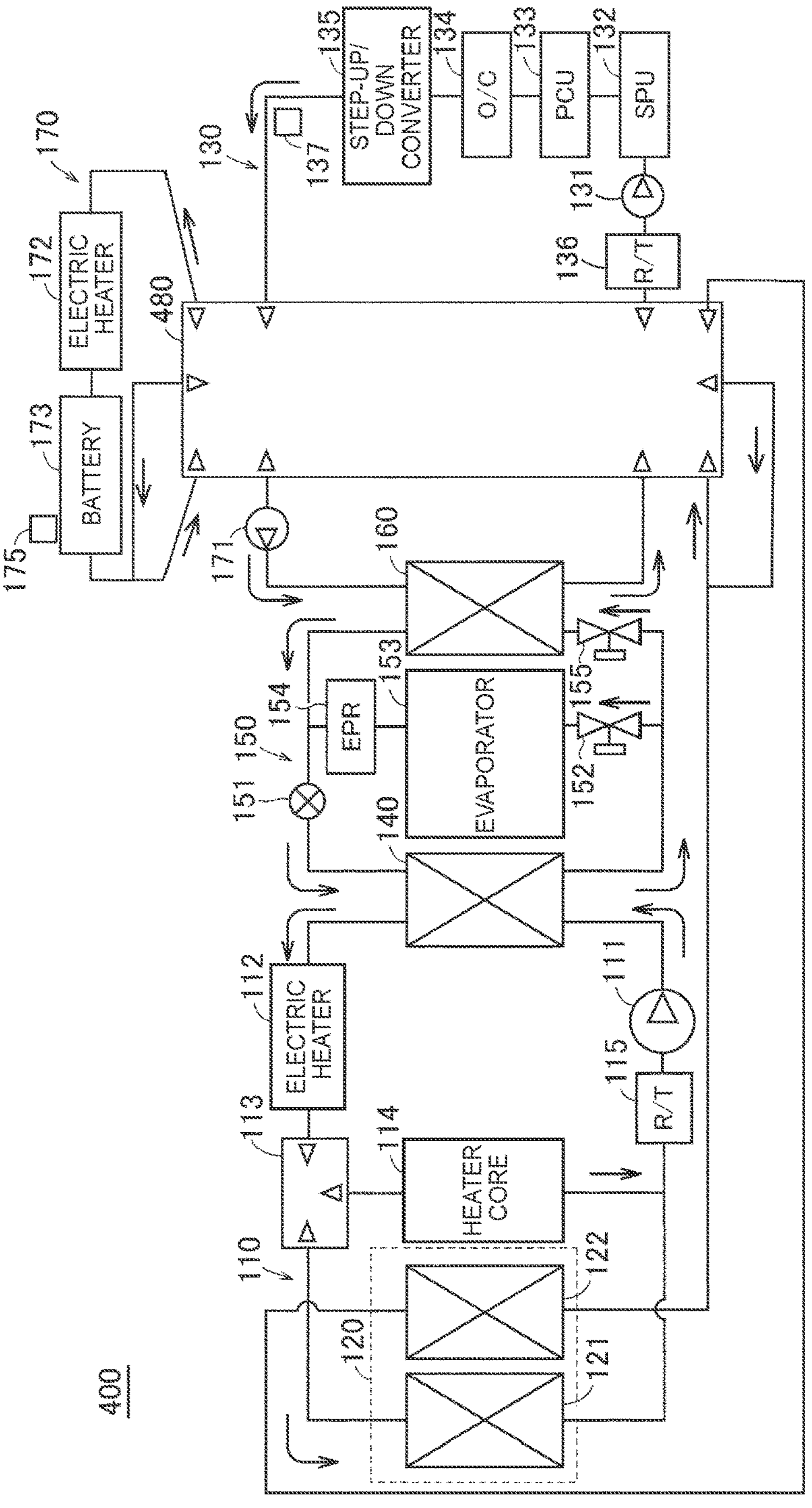
FIG. 16 is a block diagram that shows the configuration of a heat management system according to a second modification of the second embodiment.

In the heat management circuits of the above embodiments, a high-temperature circuit 110 shown in FIG. 15 and FIG. 16 may be provided. Specifically, a heat management circuit 300 shown in FIG. 15 includes, for example, the high-temperature circuit 110, a radiator 120, a low-temperature circuit 130, a condenser 140, a refrigerating cycle 150, a chiller 160, a battery circuit 170, the six-way valve 380, and the six-way valve 390. The chiller 160 is an example of the chiller device according to the aspect of the disclosure.

A heat management circuit 400 shown in FIG. 16 includes, for example, the high-temperature circuit 110, the radiator 120, the low-temperature circuit 130, the condenser 140, the refrigerating cycle 150, the chiller 160, the battery circuit 170, and the ten-way valve 480.

The high-temperature circuit 110 includes, for example, a water pump (W/P) 111, an electric heater 112, a three-way valve 113, a heater core 114, and a reservoir tank (R/T) 115. The heater core 114 is an example of the air-conditioning circuit according to the aspect of the disclosure.

The radiator 120 includes a high-temperature (HT) radiator 121 and a low-temperature (LT) radiator 122. The low-temperature radiator 122 is an example of the radiator according to the aspect of the disclosure.

The low-temperature circuit 130 includes, for example, a water pump 131, an SPU 132, a PCU 133, an oil cooler 134, a step-up/down converter 135, a reservoir tank 136, and a heat medium temperature sensor 137. The PCU 133 and the oil cooler 134 are an example of the drive unit according to the aspect of the disclosure. The heat medium temperature sensor 137 is an example of the second temperature sensor according to the aspect of the disclosure.

The refrigerating cycle 150 includes, for example, a compressor 151, an expansion valve 152, an evaporator 153, an evaporative pressure regulator (EPR) 154, and an expansion valve 155.

The battery circuit 170 includes, for example, a water pump 171, an electric heater 172, the battery 173, and a battery temperature sensor 175. The battery 173 is an example of the electrical storage device according to the aspect of the disclosure. The battery temperature sensor 175 is an example of the first temperature sensor according to the aspect of the disclosure.

The configurations (processes) of the above-described embodiments and the above-described modifications may be combined with each other.

Figure 17:
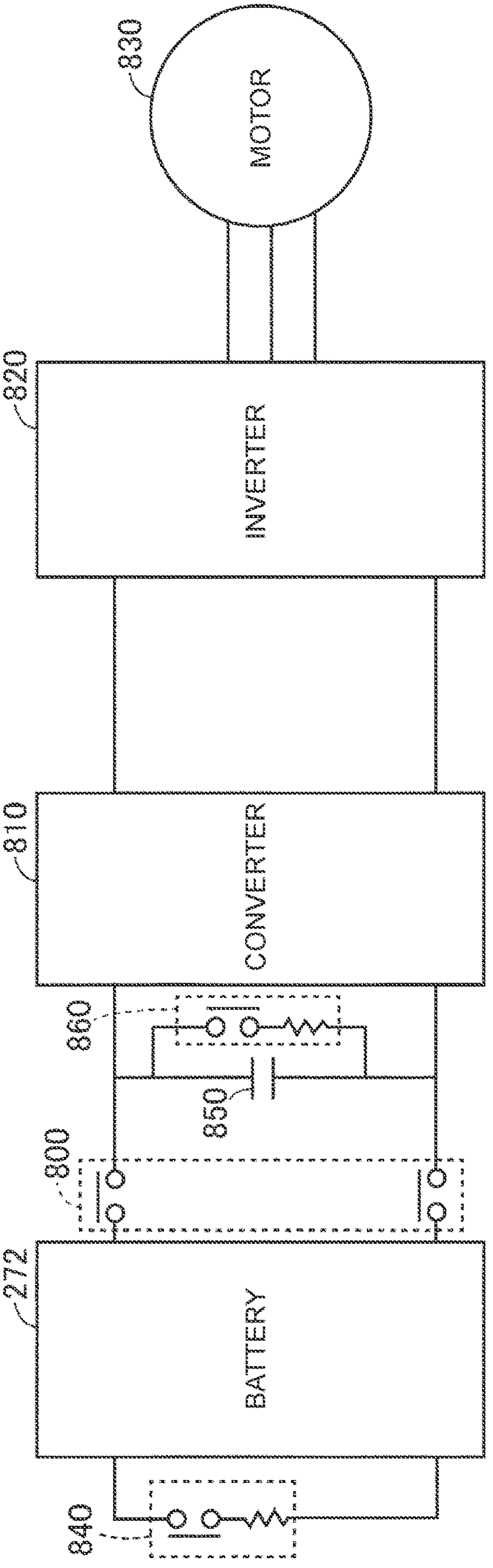
FIG. 17 is a block diagram that shows a circuit configuration including a battery, a converter, an inverter, and a motor.

The details of heating control of the battery will be described with reference to FIG. 17. The battery 272 is connected to a converter 810 via a system main relay (SMR) 800. The converter 810 is connected to the inverter 820. The inverter 820 is connected to a motor 830. A discharge circuit 840 including a switch and a resistive element is connected to the battery 272. A smoothing capacitor 850 is provided between the battery 272 and the converter 810. A discharge circuit 860 made up of a switch and a resistive element is connected in parallel with the smoothing capacitor 850.

Heating control of the battery 272 may include, for example, control to electrically disconnect the SMR 800 and turn on the switch of the discharge circuit 840. Thus, a current flows through a closed circuit formed by the battery 272 and the discharge circuit 840. Heating control of the battery 272 may include control to turn off the switch of the discharge circuit 840 and turn on the SMR 800 and the switch of the discharge circuit 860. Thus, a current flows through a closed circuit formed by the battery 272, the SMR 800, and the discharge circuit 860. Heating control of the battery 272 may include control to turn on the SMR 800 and pass a current adjusted such that no torque is generated in the motor 830 in a state where the switch of the discharge circuit 840 and the switch of the discharge circuit 860 are off.

The embodiments described above are illustrative and not restrictive in all respects. The scope of the disclosure is not defined by the description of the above-described embodiments, and is defined by the appended claims. The scope of the disclosure is intended to encompass all modifications within the scope of the appended claims and equivalents thereof.

What is claimed is:

1. A heat management system provided in an electrical apparatus, the heat management system comprising:

a first channel, a second channel, a third channel, and a fourth channel configured such that a heat medium is allowed to flow through the first channel, the second channel, the third channel, and the fourth channel;

a battery configured to exchange heat with the heat medium in the first channel;

a drive unit configured to exchange heat with the heat medium in the second channel and be capable of generating driving force;

a radiator provided in the third channel;

a chiller device provided in the fourth channel; and a switching unit configured to be capable of switching a connection status among the first channel, the second channel, the third channel, and the fourth channel, wherein:

a channel circuit in which the battery, the drive unit, the radiator, and the chiller device are isolated and independent of one another is defined as a heating circuit;

wherein when the battery is heated by passing current through the battery, the switching unit is configured to form the heating circuit, and a processor that is configured to control a current flowing through the battery, wherein the processor is configured to control the switching unit such that a connection among the first channel, the second channel, the third channel and the fourth channel is disconnected when the battery is heated by passing current through the battery.

2. The heat management system according to claim 1, wherein:

the electrical apparatus is an electrified vehicle; and when a driving system of the electrified vehicle is started, the battery is heated.

3. The heat management system according to claim 1, wherein:

the battery is configured to be capable of being externally charged with charging power supplied from a charging station outside the electrical apparatus; and the battery is heated such that a temperature of the battery is higher than or equal to a predetermined temperature when an external charging is started.

4. The heat management system according to claim 1, further comprising:

a first temperature sensor configured to detect a temperature of the battery; and a second temperature sensor configured to detect a temperature of the heat medium in the second channel, wherein when the battery is heated by passing current through the battery, the switching unit is configured to form the heating circuit when the detected temperature of the heat medium is lower than the detected temperature of the battery.

5. The heat management system according to claim 1, wherein:

the electrical apparatus is an electrified vehicle;

the chiller device is configured to exchange heat with an air-conditioning circuit configured to adjust a cabin temperature of the electrified vehicle; and when a heating request using the air-conditioning circuit is issued and an outside air temperature is lower than or equal to a predetermined threshold, the battery is heated in a state where the heating circuit is formed.

6. The heat management system according to claim 5, wherein, when the battery is heated by passing current through the battery in the state where the heating circuit is formed, the switching unit is configured to, when the outside air temperature becomes higher than the predetermined threshold, form a channel circuit with which the radiator and the chiller device are connected.

7. The heat management system according to claim 1, wherein the switching unit includes a first six-way valve configured to connect the first channel and the second channel, and the fourth channel or disconnect the first channel and the second channel, and the fourth channel, and a second six-way valve configured to connect the second channel, and the third channel and the fourth channel or disconnect the second channel, and the third channel and the fourth channel.

8. The heat management system according to claim 1, wherein the switching unit includes a ten-way valve configured to connect the first channel and the second channel, and the third channel and the fourth channel or disconnect the first channel and the second channel, and the third channel and the fourth channel.

9. The heat management system according to claim 1, further comprising:

a first temperature sensor configured to detect the temperature of the battery; and a second temperature sensor configured to detect a temperature of a heat medium in the second channel, wherein the processor is configured to determine whether the detected temperature of the battery is higher than the detected temperature of the heat medium, and when the processor determines that the detected temperature of the battery is higher than the detected temperature of the heat medium, control the switching unit such that the first channel is disconnected from the second channel, the third channel, and the fourth channel.

10. An electrified vehicle comprising the heat management system according to claim 1, wherein the electrical apparatus is the electrified vehicle.

11. The electrified vehicle according to claim 10, further comprising:

an air-conditioning circuit configured to adjust a cabin temperature of the electrified vehicle; and a third temperature sensor configured to detect an outside air temperature, wherein:

the chiller device is configured to exchange heat with the air-conditioning circuit; and the processor is configured to determine whether a heating request using the air-conditioning circuit is issued, and when the processor determines that the heating request using the air-conditioning circuit is issued and the outside air temperature is lower than or equal to a predetermined threshold, pass current through the battery such that the battery is heated in a state where the first channel is disconnected from the second channel, the third channel, and the fourth channel.

* * * * *